US010069186B2

(12) United States Patent
Li et al.

(10) Patent No.: US 10,069,186 B2
(45) Date of Patent: Sep. 4, 2018

(54) METHOD AND DEVICE FOR OBTAINING ANTENNA ENGINEERING PARAMETER AND SYSTEM

(71) Applicant: Huawei Technologies Co., Ltd., Shenzhen (CN)

(72) Inventors: Yingzhe Li, Shanghai (CN); Hongzhuo Zhang, Shanghai (CN); Li Yang, Shanghai (CN); Yang He, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 13 days.

(21) Appl. No.: 15/360,702

(22) Filed: Nov. 23, 2016

(65) Prior Publication Data

US 2017/0077586 A1    Mar. 16, 2017

Related U.S. Application Data

(63) Continuation of application No. PCT/CN2014/078547, filed on May 27, 2014.

(51) Int. Cl.
*G06K 9/00* (2006.01)
*H01Q 1/12* (2006.01)
(Continued)

(52) U.S. Cl.
CPC ............. *H01Q 1/125* (2013.01); *G01B 11/26* (2013.01); *G06T 7/60* (2013.01); *G06T 7/73* (2017.01);
(Continued)

(58) Field of Classification Search
USPC .............. 250/201.7; 342/357.2, 357.36, 359; 345/904; 356/601; 375/259; 701/468
See application file for complete search history.

(56) References Cited

U.S. PATENT DOCUMENTS 6,016,120 A * 1/2000 McNabb ............. H01Q 1/1257
    342/357.36
6,177,955 B1 * 1/2001 Downen ................ G09G 3/006
    345/904
(Continued)

FOREIGN PATENT DOCUMENTS

CN    102187597 A    9/2011
CN    102509902 A    6/2012
(Continued)

OTHER PUBLICATIONS

Wang, Mingyu, et al., "A Calibration Method for Extrinsic Parameters Based on Four Points," Multimedia Technology (ICMT), International Conference on, IEEE, Piscataway, NJ, Oct. 29, 2010, 4 pages.

*Primary Examiner* — Xuemei Chen
(74) *Attorney, Agent, or Firm* — Slater Matsil, LLP

(57) ABSTRACT

A method and device and a system are disclosed. The method may include: obtaining, by a measurement device, a first image that is obtained by photographing an antenna at a first position (101); mapping M characteristic points included in the first image into a first three-dimensional spatial coordinate system, to obtain M three-dimensional space points that are in the first three-dimensional spatial coordinate system and that have a mapping relationship with the M characteristic points (102), where a first mapping photographing direction is parallel to a direction of an axis in the first three-dimensional spatial coordinate system, and the first mapping photographing direction is obtained by mapping a photographing direction of photographing the first image into the first three-dimensional spatial coordinate system; and obtaining a downtilt of the antenna according to a first angle and/or obtaining an azimuth of the antenna according to a second angle (103).

18 Claims, 8 Drawing Sheets

(51) Int. Cl.
*H01Q 1/00* (2006.01)
*H04B 17/10* (2015.01)
*G06T 7/60* (2017.01)
*G06T 7/73* (2017.01)
*G01B 11/26* (2006.01)

(52) U.S. Cl.
CPC ............ *H01Q 1/00* (2013.01); *H04B 17/102* (2015.01); *H04B 17/101* (2015.01)

(56) References Cited

U.S. PATENT DOCUMENTS

| | | | | |
|---|---|---|---|---|
| 6,195,559 B1 * | 2/2001 | Rapeli | ................... | H01Q 1/242 342/359 |
| 6,487,517 B2 * | 11/2002 | Sakai | ................... | G01C 11/00 250/201.7 |
| 6,686,889 B1 * | 2/2004 | Kwon | ................... | H01Q 1/125 342/359 |
| 6,774,843 B2 * | 8/2004 | Takahashi | ............... | G01S 19/36 342/357.52 |
| 7,576,702 B2 | 8/2009 | Yin et al. | | |
| 8,334,985 B2 * | 12/2012 | Sho | ................... | G01B 11/2509 356/601 |
| 8,766,847 B2 * | 7/2014 | Zhao | ....................... | G01S 13/06 342/357.2 |
| 9,001,917 B2 * | 4/2015 | Tzanidis | ............... | H04B 7/0456 375/259 |
| 9,182,469 B2 * | 11/2015 | Harriman | ................. | H01Q 3/04 |
| 2001/0018638 A1 * | 8/2001 | Quincke | ............. | A01B 79/005 701/468 |
| 2008/0284669 A1 | 11/2008 | Hunton et al. | | |
| 2011/0151932 A1 | 6/2011 | Kim | | |
| 2013/0346871 A1 | 12/2013 | Ono | | |
| 2014/0205205 A1 | 7/2014 | Neubauer | | |
| 2016/0079651 A1 * | 3/2016 | Xu | ....................... | H01Q 1/1257 342/359 |

FOREIGN PATENT DOCUMENTS

| | | |
|---|---|---|
| CN | 103516896 A | 1/2014 |
| EP | 2784533 A1 | 10/2014 |
| WO | 2013003872 A1 | 1/2013 |

* cited by examiner

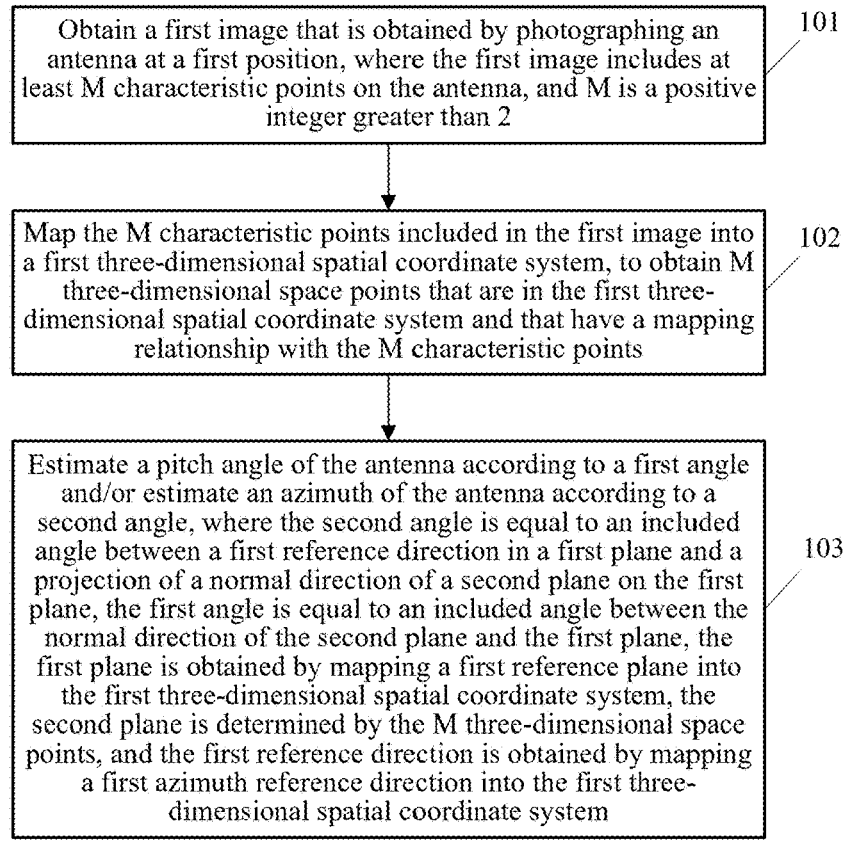
FIG. 1
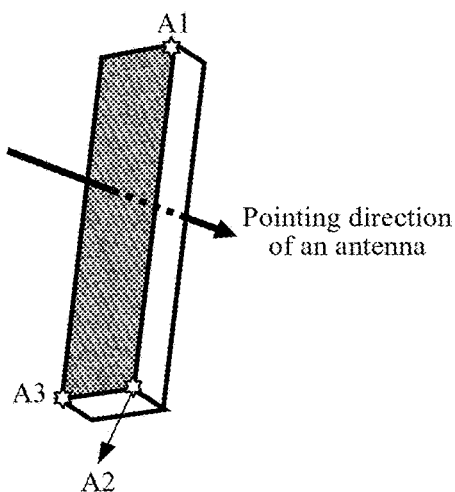
FIG. 2-a

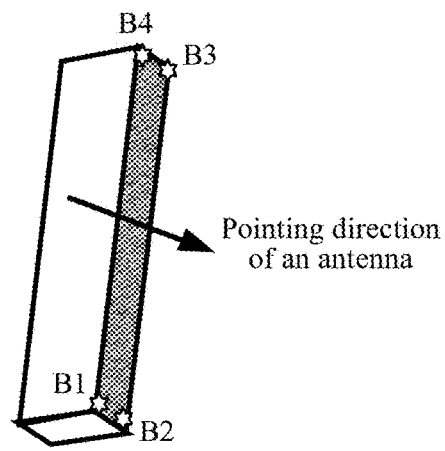
FIG. 2-b
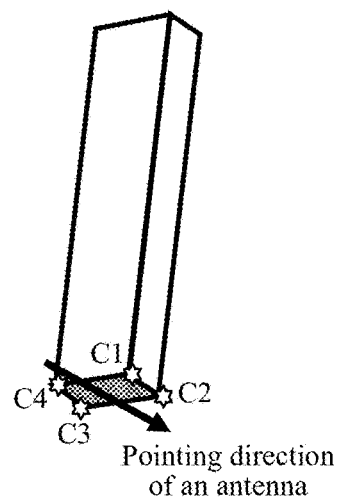
FIG. 2-c
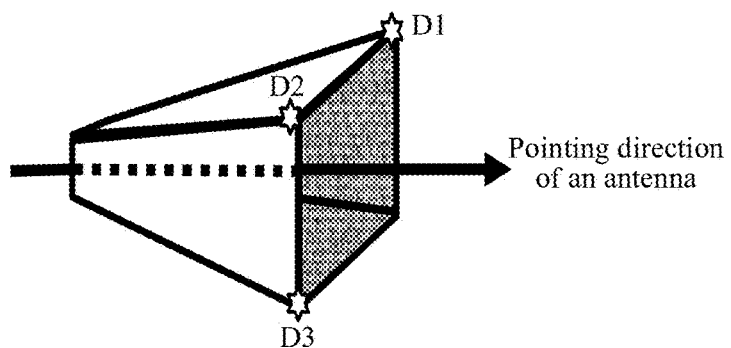
FIG. 2-d

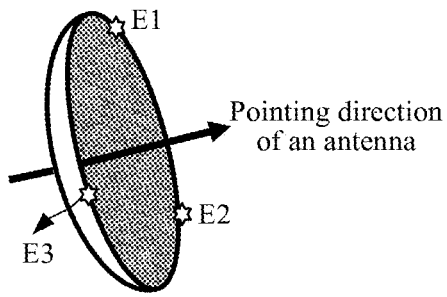
FIG. 2-e
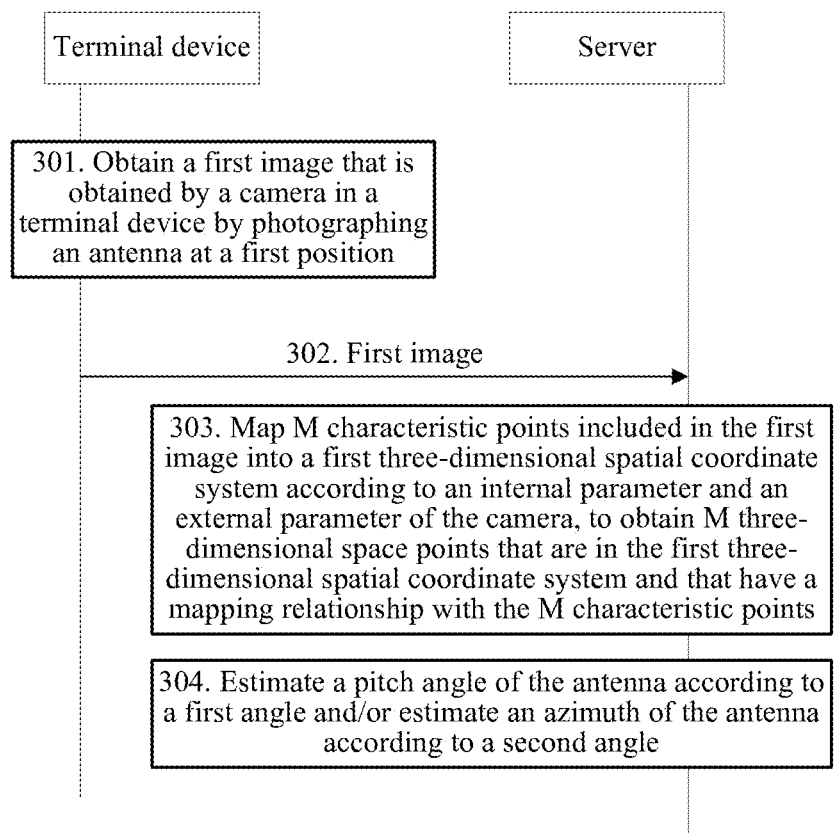
FIG. 3

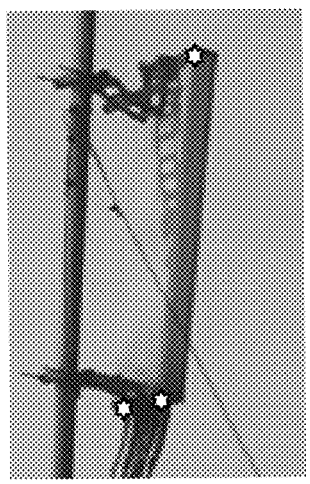
FIG. 4-a
FIG. 4-b
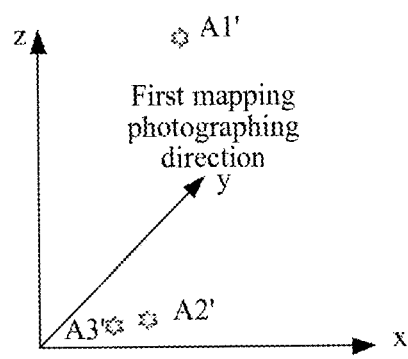
FIG. 4-c

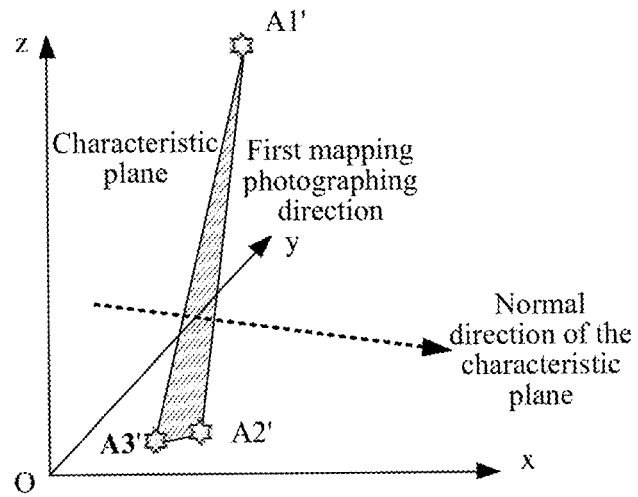
FIG. 4-d
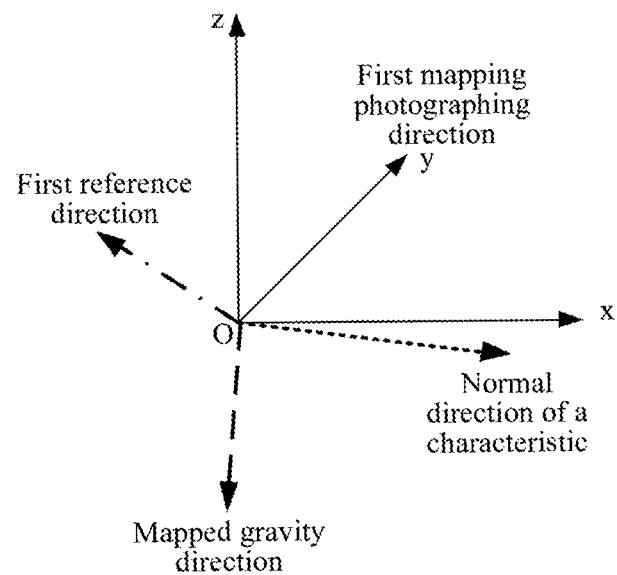
FIG. 4-e

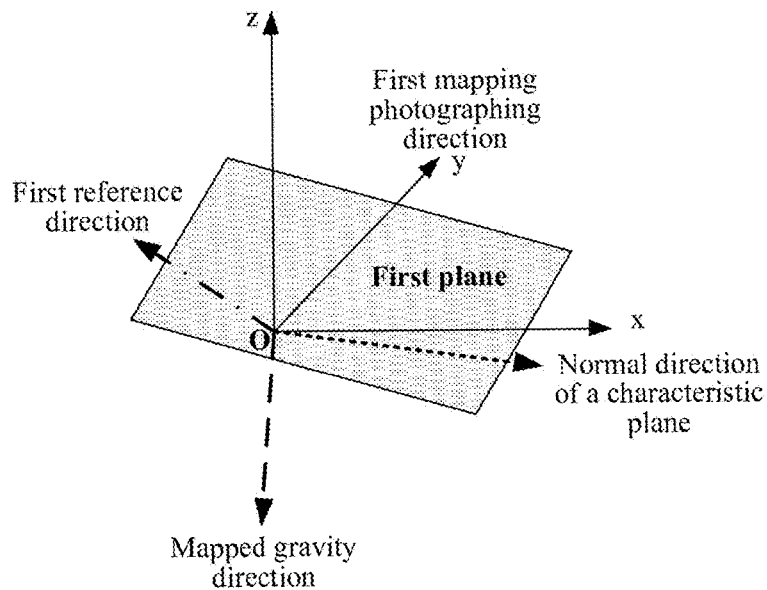
FIG. 4-f
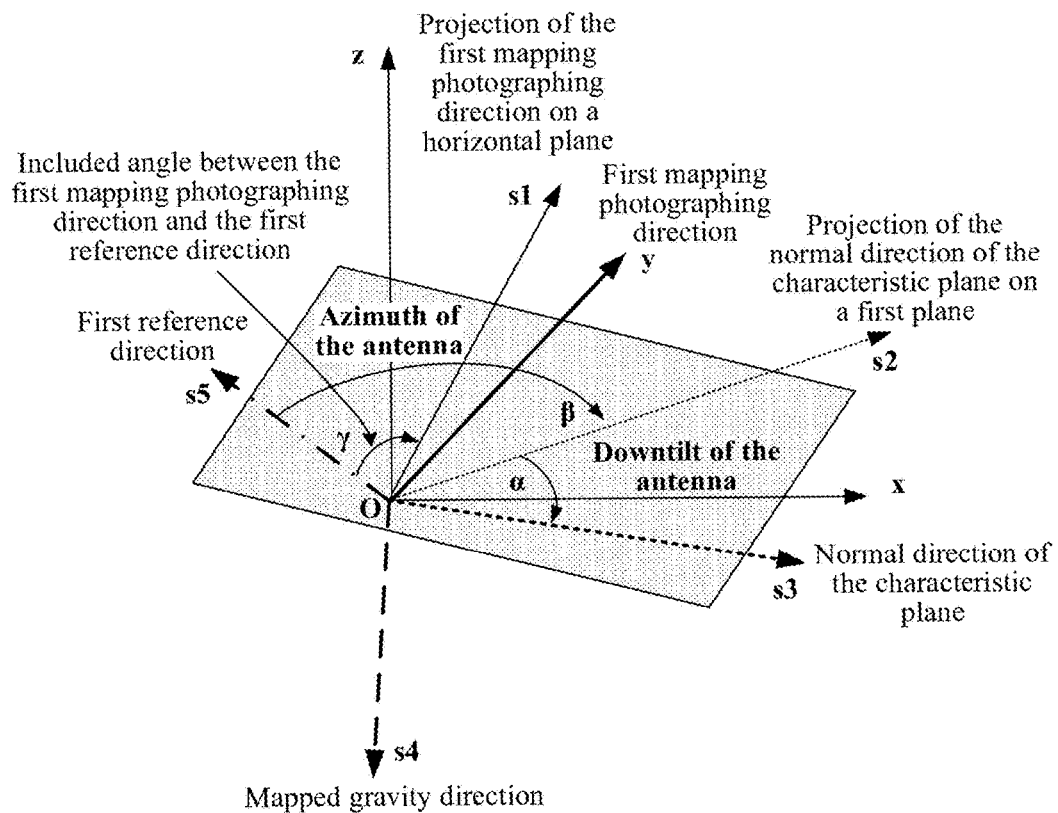
FIG. 4-g

METHOD AND DEVICE FOR OBTAINING ANTENNA ENGINEERING PARAMETER AND SYSTEM

CROSS-REFERENCE TO RELATED APPLICATIONS

This application is a continuation of International Application No. PCT/CN2014/078547, filed on May 27, 2014, the disclosure of which is hereby incorporated by reference in its entirety.

TECHNICAL FIELD

The present invention relates to the field of communications technologies, and in particular, to a method and device for obtaining an antenna engineering parameter and a related system.

BACKGROUND

An antenna is an important component in a wireless communications device. Main parameters of the antenna include: an antenna azimuth, an antenna downtilt, and the like. Facts prove that accuracy of these main parameters of the antenna directly affects reception and transmission performance of the wireless communications device. For example, during network construction, parameters such as an antenna azimuth and an antenna downtilt that are designed in advance need to be used to install an antenna. During network optimization, an antenna azimuth, an antenna downtilt, and the like may also need to be adjusted and optimized.

Some errors may occur during installation or adjustment of the antenna, and as a result, the antenna azimuth, the antenna downtilt, and the like that are designed in advance may fail to be applied correctly. For an actually installed antenna, an azimuth, a downtilt, and the like may be different from the antenna azimuth, the antenna downtilt, and the like that are designed in advance. Therefore, an azimuth and a downtilt during actual installation of an antenna (actual parameters of the antenna such as the azimuth and the downtilt during actual installation of the antenna may be referred to as antenna engineering parameters) need to be measured sometimes. The measured antenna engineering parameters may be compared with designed antenna engineering parameters, to perform particular adjustments to an antenna azimuth, an antenna downtilt, and the like, thereby further improving reception and transmission performance of a signal. An existing method for obtaining an antenna engineering parameter mainly relies on on-site manual measurement, and installation personnel measure an antenna azimuth in an outdoor field by using a compass, measure an antenna downtilt in an outdoor field by using a protractor, and record data obtained through measurement.

During research and practice of the prior art, the inventors of the present invention find that the prior art has at least the following problems: Factors such as a skill level of an engineer, meticulousness of an engineer, measurement difficulty in an on-site condition, and a level of surrounding electromagnetic interference may all significantly affect measurement precision of an actual azimuth and downtilt of an antenna. When obtained antenna engineering parameters are inaccurate, a case such as an error in a result of radio frequency optimization of a wireless network or an error in configuration of a switching parameter may occur, which may further cause a severe result such as a mass connection loss.

SUMMARY

Embodiments of the present invention provide a method and device for obtaining an antenna engineering parameter and a system, so as to improve precision of an obtained antenna engineering parameter, thereby providing a basis for improvement of reception and transmission performance of a signal.

According to a first aspect, a method for measuring an antenna engineering parameter is provided, and the method includes obtaining, by a measurement device, a first image that is obtained by photographing an antenna at a first position. The first image includes at least M characteristic points on the antenna, the M characteristic points are characteristic points on a surface of the antenna, the M characteristic points are in a same plane but are not on a same straight line, and M is a positive integer greater than 2. The method further includes mapping, by the measurement device, the M characteristic points into a first three-dimensional spatial coordinate system, to obtain M three-dimensional space points that are in the first three-dimensional spatial coordinate system and that have a mapping relationship with the M characteristic points. A first mapping photographing direction is parallel to a direction of an axis in the first three-dimensional spatial coordinate system, or an included angle having a specified angle exists between a first mapping photographing direction and a direction of an axis in the first three-dimensional spatial coordinate system. The first mapping photographing direction is obtained by mapping a photographing direction of photographing the first image into the first three-dimensional spatial coordinate system. The method further includes obtaining, by the measurement device, a downtilt of the antenna according to a first angle and/or obtaining an azimuth of the antenna according to a second angle. The second angle is equal to an included angle between a first reference direction in a first plane and a projection of a normal direction of a second plane on the first plane, the first angle is equal to an included angle between the normal direction of the second plane and the first plane. The first plane is obtained by mapping a first reference plane into the first three-dimensional spatial coordinate system. The second plane is determined by the M three-dimensional space points, and the first reference direction is obtained by mapping a first azimuth reference direction into the first three-dimensional spatial coordinate system. The first azimuth reference direction is a due north direction or a due south direction, or a first included angle greater than 0 degree exists between the first azimuth reference direction and a due north direction, or a second included angle greater than 0 degree exists between the first azimuth reference direction and a due south direction. The first reference plane is a horizontal plane, or a third included angle greater than 0 degree exists between the first reference plane and a horizontal plane.

With reference to the first aspect, in a first possible implementation manner of the first aspect, the normal direction of the second plane is parallel to a direction obtained by mapping a pointing direction of the antenna into the first three-dimensional spatial coordinate system, or a fourth included angle greater than 0 degree exists between the normal direction of the second plane and a direction obtained by mapping a pointing direction of the antenna into the first three-dimensional spatial coordinate system.

With reference to the first aspect or the first possible implementation manner of the first aspect, in a second possible implementation manner of the first aspect, the obtaining a first image that is obtained by photographing an antenna at a first position includes: obtaining the first image that is obtained by a camera by photographing the antenna at the first position; and the mapping the M characteristic points into a first three-dimensional spatial coordinate system includes: mapping the M characteristic points into the first three-dimensional spatial coordinate system according to an internal parameter and an external parameter of the camera. The first image is a digital photograph. The external parameter of the camera is (R, T). The internal parameter of the camera is (fx, fy, u0, v0). A mapping relationship between pixel coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system is as follows.

$$\begin{bmatrix} u_p \\ v_p \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

where $x_w$, $y_w$, and $z_w$ indicate a coordinate point in a world coordinate system, T indicates the origin of the world coordinate system, R indicates an orthogonal rotation matrix, $f_x$ and $f_y$ indicate focal lengths of the camera in an x direction and in a y direction, and $u_0$ and $v_0$ indicate a center of imaging.

With reference to the first aspect or the first possible implementation manner of the first aspect, in a third possible implementation manner of the first aspect, the obtaining a first image that is obtained by photographing an antenna at a first position includes: obtaining the first image that is obtained by a camera by photographing the antenna at the first position; and the mapping the M characteristic points included in the first image into the first three-dimensional spatial coordinate system includes: mapping the M characteristic points included in the first image into the first three-dimensional spatial coordinate system according to an internal parameter and an external parameter of the camera and a uniform scaling parameter z from a photosensitive component of the camera to the first image.

With reference to the third possible implementation manner of the first aspect, in a fourth possible implementation manner of the first aspect, the first image is a film photograph; the external parameter of the camera is (R, T); the internal parameter of the camera is (fx, fy, u0, v0); and a mapping relationship between coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system is as follows.

$$\begin{bmatrix} u_p \\ v_p \\ 1 \end{bmatrix} = z \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

where $x_w$, $y_w$, and $z_w$ indicate a coordinate point in a world coordinate system, T indicates the origin of the world coordinate system, R indicates an orthogonal rotation matrix, $f_x$ and $f_y$ indicate focal lengths of the camera in an x direction and in a y direction, $u_0$ and $v_0$ indicate a center of imaging, and z is a uniform scaling coefficient from a photosensitive component to a photograph.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the method further includes: obtaining, by the measurement device, a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and mapping, by the measurement device, the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system, where the obtaining a downtilt of the antenna according to a first angle includes: obtaining the downtilt of the antenna according to the first angle and a third angle, where the third angle is equal to an included angle between a normal direction of a fourth plane and a third plane, the third plane is obtained by mapping the first reference plane into the second three-dimensional spatial coordinate system, and the fourth plane is determined by the N three-dimensional space points.

With reference to the first aspect, the first possible implementation manner of the first aspect, the second possible implementation manner of the first aspect, the third possible implementation manner of the first aspect, or the fourth possible implementation manner of the first aspect, in a sixth possible implementation manner of the first aspect, the method further includes: obtaining, by the measurement device, a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and mapping, by the measurement device, the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system, where the obtaining an azimuth of the antenna according to a second angle includes: obtaining the azimuth of the antenna according to the second angle and a fourth angle, where the fourth angle is equal to an included angle between a first reference direction in a third plane and a projection of a normal direction of a fourth plane on the third plane, the first reference direction is obtained by mapping the first azimuth reference direction into the first three-dimensional spatial coordinate system, the third plane is obtained by mapping the first reference plane into the second three-dimensional spatial coordinate system, and the fourth plane is determined by the N three-dimensional space points.

According to a second aspect, an apparatus for measuring an antenna engineering parameter is provided, and the apparatus may include an obtaining unit configured to obtain a first image that is obtained by photographing an antenna at a first position. The first image includes at least M characteristic points on the antenna, the M characteristic points are characteristic points on a surface of the antenna, the M characteristic points are in a same plane but are not on a same straight line, and M is a positive integer greater than 2. A mapping unit is configured to map the M characteristic points included in the first image into a first three-dimensional spatial coordinate system, to obtain M three-dimensional space points that are in the first three-dimensional spatial coordinate system and that have a mapping relationship with the M characteristic points. A first mapping photographing direction is parallel to a direction of an axis in the first three-dimensional spatial coordinate system, or an included angle having a specified angle exists between a first mapping photographing direction and a direction of an axis in the first three-dimensional spatial coordinate system. The first mapping photographing direction is obtained by mapping a photographing direction of photographing the first image into the first three-dimensional spatial coordinate system. An estimation unit, configured to obtain a downtilt of the antenna according to a first angle and/or obtain an azimuth of the antenna according to a second angle. The second angle is equal to an included angle between a first reference direction in a first plane and a projection of a normal direction of a second plane on the first plane, the first angle is equal to an included angle between the normal direction of the second plane and the first plane. The first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system. The first azimuth reference direction is a due north direction or a due south direction, or a first included angle greater than 0 degree exists between the first azimuth reference direction and a due north direction, or a second included angle greater than 0 degree exists between the first azimuth reference direction and a due south direction. The first reference plane is a horizontal plane, or a third included angle greater than 0 degree exists between the first reference plane and a horizontal plane.

With reference to the second aspect, in a first possible implementation manner of the second aspect, the normal direction of the second plane is parallel to a direction obtained by mapping a pointing direction of the antenna into the first three-dimensional spatial coordinate system, or a fourth included angle greater than 0 degree exists between the normal direction of the second plane and a direction obtained by mapping a pointing direction of the antenna into the first three-dimensional spatial coordinate system.

With reference to the second aspect or the first possible implementation manner of the second aspect, in a second possible implementation manner of the second aspect, the obtaining unit is specifically configured to obtain the first image that is obtained by a camera by photographing the antenna at the first position; and the mapping unit is specifically configured to map the M characteristic points included in the first image into the first three-dimensional spatial coordinate system according to an internal parameter and an external parameter of the camera, where the first image is a digital photograph; the external parameter of the camera is (R, T); the internal parameter of the camera is ($f_x$, $f_y$, u0, v0); and a mapping relationship between pixel coordinates ($u_p$, $v_p$) of any characteristic point of the M characteristic points included in the first image and coordinates ($x_w$, $y_w$, $z_w$) of a three-dimensional space point obtained by mapping the characteristic point into the first three-dimensional spatial coordinate system is as follows.

$$\begin{bmatrix} u_p \\ v_p \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

where $x_w$, $y_w$, $z_w$ and indicate a coordinate point in a world coordinate system, T indicates the origin of the world coordinate system, R indicates an orthogonal rotation matrix, $f_x$ and $f_y$ indicate focal lengths of the camera in an x direction and in a y direction, and $u_0$ and $v_0$ indicate a center of imaging.

With reference to the second aspect or the first possible implementation manner of the second aspect, in a third possible implementation manner of the second aspect, the obtaining unit is specifically configured to obtain the first image that is obtained by a camera by photographing the antenna at the first position; and the mapping unit is specifically configured to map the M characteristic points included in the first image into the first three-dimensional spatial coordinate system according to an internal parameter and an external parameter of the camera and a uniform scaling parameter z from a photosensitive component of the camera to the first image.

With reference to the third possible implementation manner of the second aspect, in a fourth possible implementation manner of the second aspect, the obtaining unit is specifically configured to obtain the first image that is obtained by the camera by photographing the antenna at the first position; the mapping unit is specifically configured to map the M characteristic points included in the first image into the first three-dimensional spatial coordinate system according to the internal parameter and the external parameter of the camera, where the first image is a film photograph; the external parameter of the camera is (R, T); the internal parameter of the camera is (fx, fy, u0, v0); and a mapping relationship between coordinates ($u_p$, $v_p$) of any characteristic point of the M characteristic points included in the first image and coordinates ($x_w$, $y_w$, $z_w$) of a three-dimensional space point obtained by mapping the characteristic point into the first three-dimensional spatial coordinate system is as follows.

$$\begin{bmatrix} u_p \\ v_p \\ 1 \end{bmatrix} = z \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

where $x_w$, $y_w$, and $z_w$ indicate a coordinate point in a world coordinate system, T indicates the origin of the world coordinate system, R indicates an orthogonal rotation matrix, $f_x$ and $f_y$ indicate focal lengths of the camera in an x direction and in a y direction, $u_0$ and $v_0$ indicate a center of imaging, and z is a uniform scaling coefficient from a photosensitive component to a photograph.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the obtaining unit is further configured to obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2. The mapping unit is further configured to map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system. In the aspect of obtaining a downtilt of the antenna according to a first angle, the estimation unit is specifically configured to obtain the downtilt of the antenna according to the first angle and a third angle, where the third angle is equal to an included angle between a normal direction of a fourth plane and a third plane, the third plane is obtained by mapping the first reference plane into the second three-dimensional spatial coordinate system, and the fourth plane is determined by the N three-dimensional space points.

With reference to the second aspect, the first possible implementation manner of the second aspect, the second possible implementation manner of the second aspect, the third possible implementation manner of the second aspect, or the fourth possible implementation manner of the second aspect, in a sixth possible implementation manner of the second aspect, the obtaining unit is further configured to obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2. The mapping unit is further configured to map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system, where in the aspect of obtaining an azimuth of the antenna according to a second angle, the estimation unit is specifically configured to obtain the azimuth of the antenna according to the second angle and a fourth angle, where the fourth angle is equal to an included angle between a first reference direction in a third plane and a projection of a normal direction of a fourth plane on the third plane, the first reference direction is obtained by mapping the first azimuth reference direction into the first three-dimensional spatial coordinate system, the third plane is obtained by mapping the first reference plane into the second three-dimensional spatial coordinate system, and the fourth plane is determined by the N three-dimensional space points.

A third aspect of the embodiments of the present invention further provides a computer storage medium, where the computer storage medium stores a program, and when the program is executed, some or all of the steps of the method for obtaining an antenna engineering parameter in the foregoing method embodiment are included.

As can be seen, in the solutions in the embodiments of the present invention, a first image that is obtained by photographing an antenna at a first position is obtained, where the first image includes at least M characteristic points on the antenna, the M characteristic points are characteristic points on a surface of the antenna, the M characteristic points are in a same plane but are not on a same straight line, and M is a positive integer greater than 2; the M characteristic points included in the first image are mapped into a first three-dimensional spatial coordinate system, to obtain M three-dimensional space points that are in the first three-dimensional spatial coordinate system and that have a mapping relationship with the M characteristic points. In this way, a mapping relationship between a practical scenario and a mathematical model is established, and a photographing direction of photographing the first image by a camera is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that in the solutions in the embodiments of the present invention, a photograph of a practical scenario is used to establish a mapping relationship between a practical scenario and a mathematical model, so as to to calculate an engineering parameter of an antenna by using such a mathematical model. Compared with an existing manner of on-site manual measurement, the solutions provided in the embodiments of the present invention help to improve precision of an obtained antenna engineering parameter, thereby providing a basis for improvement of reception and transmission performance of a signal. Moreover, because basically only a photograph of an antenna needs to be photographed and used as input for measurement, such a solution also helps to greatly reduce difficulty of measuring an antenna engineering parameter.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic flowchart of a method for obtaining an antenna engineering parameter according to an embodiment of the present invention;

FIG. 2-*a* is a schematic diagram of an antenna pointing direction and characteristic point position distribution of a panel antenna according to an embodiment of the present invention;

FIG. 2-*b* is a schematic diagram of an antenna pointing direction and characteristic point position distribution of another panel antenna according to an embodiment of the present invention;

FIG. 2-*c* is a schematic diagram of an antenna pointing direction and characteristic point position distribution of another panel antenna according to an embodiment of the present invention;

FIG. 2-*d* is a schematic diagram of an antenna pointing direction and characteristic point position distribution of a horn antenna according to an embodiment of the present invention;

FIG. 2-*e* is a schematic diagram of an antenna pointing direction and characteristic point position distribution of a paraboloidal reflector antenna according to an embodiment of the present invention;

FIG. 3 is a schematic flowchart of another method for obtaining an antenna engineering parameter according to an embodiment of the present invention;

FIG. 4-*a* is a schematic diagram of a photograph of an antenna according to an embodiment of the present invention;

FIG. 4-*b* is a schematic diagram of an equivalent geometrical model of the photograph of the antenna shown in FIG. 4-*b* according to an embodiment of the present invention;

FIG. 4-*c* is a schematic diagram of mapping of characteristic points into a three-dimensional spatial coordinate system in the photograph of the antenna shown in FIG. 4-*a* according to an embodiment of the present invention;

FIG. 4-*d* is a schematic diagram of a characteristic plane determined by the several characteristic points shown in FIG. 4-*c* in a three-dimensional spatial coordinate system according to an embodiment of the present invention;

FIG. 4-*e* is a schematic diagram of mapping of a first reference direction and a gravity direction into a three-dimensional spatial coordinate system according to an embodiment of the present invention;

FIG. 4-*f* is a schematic diagram of mapping of a first reference plane into a three-dimensional spatial coordinate system according to an embodiment of the present invention;

FIG. 4-*g* is a schematic diagram of an antenna azimuth and an antenna downtilt according to an embodiment of the present invention;

DETAILED DESCRIPTION OF ILLUSTRATIVE EMBODIMENTS

Figure 5:
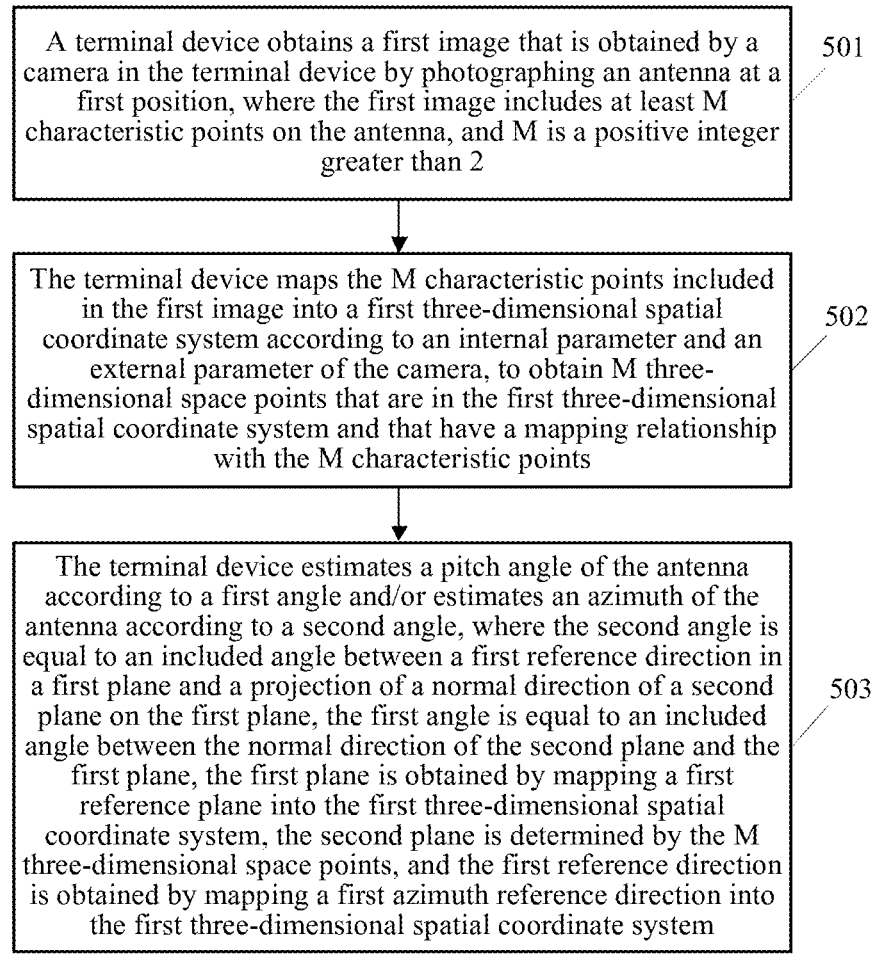
FIG. 5 is a schematic flowchart of another method for obtaining an antenna engineering parameter according to an embodiment of the present invention.

Embodiments of the present invention provide a method and device for obtaining an antenna engineering parameter and a system, so as to improve precision of an obtained antenna engineering parameter, thereby providing a basis for improvement of reception and transmission performance of a signal.

Detailed descriptions are separately provided below by means of specific embodiments.

To make the invention objectives, characteristic s, and advantages of the present invention clearer and more comprehensible, the following clearly and completely describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art according to the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

In an embodiment of a method for measuring an antenna engineering parameter of the present invention, the method for measuring an antenna engineering parameter may include: obtaining, by a measurement device, a first image that is obtained by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; mapping, by the measurement device, the M characteristic points included in the first image into a first three-dimensional spatial coordinate system, to obtain M three-dimensional space points that are in the first three-dimensional spatial coordinate system and that have a mapping relationship with the M characteristic points, where a first mapping photographing direction may be parallel to the direction of an axis in the first three-dimensional spatial coordinate system, or an included angle having a specified angle exists between a first mapping photographing direction and the direction of an axis in the first three-dimensional spatial coordinate system, and the first mapping photographing direction is obtained by mapping a photographing direction of photographing the first image into the first three-dimensional spatial coordinate system; and obtaining a downtilt of the antenna according to a first angle and/or obtaining an azimuth of the antenna according to a second angle, where the second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

Referring to FIG. 1, FIG. 1 is a schematic flowchart of a method for measuring an antenna engineering parameter according to an embodiment of the present invention. The method for measuring an antenna engineering parameter according to this embodiment of the present invention may include the following content:

101: A measurement device obtains a first image that is obtained by a camera by photographing an antenna at a first position.

The first image includes at least M characteristic points on the antenna, the M characteristic points are characteristic points on a surface of the antenna, the M characteristic points are in a same plane but are not on a same straight line, where M is a positive integer greater than 2.

It may be understood that, the antenna may include k characteristic points, and the M characteristic points may be some or all of the characteristic points of the k characteristic points. A position relationship between a plane defined by these characteristic points and a pointing direction of the antenna may be determined. For example, the position relationship between the plane defined by these characteristic points and the pointing direction of the antenna may be a parallel relationship, a perpendicular relationship or a relationship of another specific angle.

102: Map the M characteristic points included in the first image into a first three-dimensional spatial coordinate system, to obtain M three-dimensional space points that are in the first three-dimensional spatial coordinate system and that have a mapping relationship with the M characteristic points.

A first mapping photographing direction may be parallel to the direction of an axis in the first three-dimensional spatial coordinate system, or an included angle having a specified angle exists between a first mapping photographing direction and the direction of an axis in the first three-dimensional spatial coordinate system, and the first mapping photographing direction is obtained by mapping a photographing direction of photographing the first image into the first three-dimensional spatial coordinate system. To reduce computational complexity, in an example of this embodiment of the present invention, an example in which the first mapping photographing direction is parallel to the direction of an axis (for example, a y axis) in the first three-dimensional spatial coordinate system is mainly used.

For example, the obtaining a first image that is obtained by photographing an antenna at a first position may include obtaining the first image that is obtained by a camera by photographing the antenna at the first position. The camera may be a component in the measurement device, or may be a component outside the measurement device. For example, the measurement device is a portable terminal device (such as a tablet or a mobile phone), and the camera is a component in the portable terminal device. Certainly, the measurement device may also be a personal computer, a server, or the like, and the camera is a component of the portable terminal device. The portable terminal obtains the first image that is obtained by the camera by photographing the antenna at the first position, and sends, to the measurement device, the first image that is obtained by the camera by photographing the antenna at the first position, so that the measurement device accordingly obtains the first image that is obtained by the camera by photographing the antenna at the first position.

The mapping the M characteristic points included in the first image into the first three-dimensional spatial coordinate system may include: mapping the M characteristic points included in the first image into the first three-dimensional spatial coordinate system according to an internal parameter and an external parameter of the camera, to obtain M three-dimensional space points that are in the first three-dimensional spatial coordinate system and that have a mapping relationship with the M characteristic points.

103: Obtain a downtilt of the antenna according to a first angle and/or obtain an azimuth of the antenna according to a second angle. The second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

In some embodiments of the present invention, the first azimuth reference direction may be, for example, a due north direction or a due south direction, or a first included angle greater than 0 degree exists between the first azimuth reference direction and a due north direction (that is, the first azimuth reference direction can be determined according to the due north direction and the first included angle), or a second included angle greater than 0 degree exists between the first azimuth reference direction and a due south direction (that is, the first azimuth reference direction can be determined according to the due south direction and the second included angle). Similarly, the first azimuth reference direction may also be, for example, a due east direction or a due west direction, or a fifth included angle greater than 0 degree exists between the first azimuth reference direction and a due east direction (that is, the first azimuth reference direction can be determined according to the due east direction and the fifth included angle), or a sixth included angle greater than 0 degree exists between the first azimuth reference direction and a due east direction (that is, the first azimuth reference direction can be determined according to the due west direction and the sixth included angle).

In some embodiments of the present invention, the first reference plane may be a horizontal plane, or a third included angle greater than 0 degree exists between the first reference plane and a horizontal plane (that is, the first reference plane can be determined according to the horizontal plane and the third included angle). Similarly, the first reference plane may also be a vertical plane, or a seventh included angle greater than 0 degree exists between the first reference plane and a vertical plane (that is, the first reference plane can be determined according to the vertical plane and the seventh included angle).

For the terminal device (such as a smartphone or a tablet computer), the terminal device may determine a due north direction or a due south direction by using a magnetic flux sensor, a compass, or the like in the terminal device. The terminal device may also obtain a gravity direction by using a gravity sensor, and a vertical plane of the gravity direction is the horizontal plane. Alternatively, a gravity direction, a due north direction, or the like may be determined by using some reference objects in the photographed image. For example, an antenna pole is usually perpendicular to a ground surface. Therefore, a vertical plane may be determined according to a pointing direction of an antenna pole. When the vertical plane is determined, the horizontal plane is determined. The horizontal plane may be mapped into a three-dimensional coordinate system and used as a reference plane. For example, the first reference plane in step 103 may be the horizontal plane, and the first plane may be obtained by mapping the horizontal plane into the first three-dimensional spatial coordinate system. It may be understood that, a scenario in which a reference direction or a reference plane is determined by using another reference object may be similar thereto.

In some embodiments of the present invention, the normal direction of the second plane may be, for example, parallel to a direction obtained by mapping a pointing direction of the antenna into a first three-dimensional coordinate system. Alternatively, a fourth included angle greater than 0 degree exists between the normal direction of the second plane and the direction obtained by mapping the pointing direction of the antenna into the first three-dimensional coordinate system (that is, the direction obtained by mapping the pointing direction of the antenna into the first three-dimensional coordinate system is determined according to the normal direction of the second plane and the fourth included angle).

It may be understood that, it is assumed that the first reference plane is the horizontal plane, a direction obtained by mapping the pointing direction of the antenna into the first three-dimensional coordinate system may be parallel to the normal direction of the second plane, and the first azimuth reference direction is a due north direction, so that the downtilt of the antenna obtained according to the first angle is equal to the first angle, and the azimuth of the antenna obtained according to the second angle is equal to the second angle. It is further assumed that, a third included angle greater than 0 degree exists between the first reference plane and the horizontal plane, a direction obtained by mapping the pointing direction of the antenna into the first three-dimensional coordinate system may be parallel to the normal direction of the second plane, and a first included angle greater than 0 degree exists between the first azimuth reference direction and a due north direction, so that geometric calibration may be performed on the first angle according to the third included angle to obtain the downtilt of the antenna (the downtilt of the antenna is equal to the first angle plus/minus the third included angle), and geometric calibration may be performed on the second angle according to the first included angle to obtain the azimuth of the antenna (the azimuth of the antenna is equal to the second angle plus/minus the first included angle). The rest can be obtained through deduction, for a manner of performing geometric calibration on the first angle to obtain the downtilt of the antenna in another scenario, details are no longer described herein, and for a manner of performing geometric calibration on the second angle to obtain the azimuth of the antenna in another scenario, details are no longer described herein.

To better understand the pointing direction of the antenna, pointing directions of several types of antennas are described below by using examples with reference to the accompanying drawings.

A pointing direction of an antenna is a direction in which the antenna points. For different types of antennas, pointing directions of the antennas may have different agreements. It is usually agreed upon in the industry that an azimuth of an antenna may refer to an included angle between a projection of a pointing direction of the antenna on a horizontal plane and a due north direction. It is usually agreed upon in the industry that a downtilt of the antenna may refer to an included angle between the pointing direction of the antenna and the horizontal plane. For example, generally, for a panel antenna (for example, an antenna shown in FIG. 2-*a* to FIG. 2-*c*) having an approximately cuboidal shape, a pointing direction of the antenna may be a vertical direction of a plane of a back panel of the antenna, and the direction is from the back panel to a front panel. For a paraboloidal reflector antenna (for example, an antenna shown in FIG. 2-*e*) or a horn antenna (for example, an antenna shown in FIG. 2-*d*), a pointing direction of the antenna is along a vertical line of a plane formed of an outer edge of a reflective surface, and the direction is from a back panel a front panel. The definitions of pointing directions of various antennas have general agreements in the industry, and therefore details are not described herein in detail one by one.

In FIG. 2-*a* to FIG. 2-*e*, possible characteristic points on several antennas are further provided as examples. For example, on the panel antenna shown in FIG. 2-*a*, possible characteristic points are A1, A2, and A3. The characteristic points A1, A2, and A3 are located on a back panel or a front panel of the antenna. A pointing direction of the antenna is a vertical direction of a plane (for example, the second plane, that is, a plane corresponding to the back panel or the front panel of the antenna) determined by these characteristic points, and the direction is from the back panel to the front panel. On the panel antenna shown in FIG. 2-*b*, possible characteristic points are B1, B2, B3, and B4. The characteristic points B1, B2, B3, and B4 are all located on a left/right-side surface. In this case, a pointing direction of the antenna is parallel to a plane defined by the characteristic points, and the direction is from a back panel to a front panel. On the panel antenna shown in FIG. 2-C, possible characteristic points are C1, C2, C3, and C4. The characteristic points C1, C2, C3, and C4 are located on a bottom surface or a top surface of the antenna. In this case, a pointing direction of the antenna is parallel to a plane defined by the characteristic points, and the direction is from a back panel to a front panel. On the paraboloidal reflector antenna shown in FIG. 2-*e*, possible characteristic points are E1, E2, and E3. The characteristic points E1, E2, and E3 are located on an outer edge of a reflective surface. In this case, a pointing direction of the antenna is perpendicular to a plane defined by the characteristic points, and the direction is from a back panel to a front panel. On the horn antenna shown in FIG. 2-d, possible characteristic points are D1, D2, and D3, and the characteristic points D1, D2, and D3 are located on an outer edge of a reflective surface. In this case, the pointing direction of the antenna is perpendicular to a plane defined by the characteristic points, and the direction is from a back panel to a front panel.

It may be understood that, the characteristic points in the positions in FIG. 2-a to FIG. 2-e are merely possible examples. Characteristic points to be selected in actual applications are not limited to these points, as long as a position relationship between a plane defined by these characteristic points and a pointing direction of an antenna can be determined.

In some embodiments of the present invention, if the first image is a digital photograph, the external parameter of the camera is ($R=[R_x, R_y, R_z]$, $T=(T_x, T_y, T_z)$).

The internal parameter of the camera is ($f_x$, $f_y$, $u_0$, $v_0$).

A mapping relationship between pixel coordinates ($u_p$, $v_p$) of any characteristic point of the M characteristic points included in the first image and coordinates ($x_w$, $y_w$, $z_w$) of a three-dimensional space point obtained by mapping the characteristic point into the first three-dimensional spatial coordinate system is shown in the following formula 1:

$$\begin{bmatrix} u_p \\ v_p \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix}, \quad \text{(formula 1)}$$

where $x_w$, $y_w$, and $z_w$ in the formula indicate a coordinate point in a world coordinate system. T indicates the origin of the world coordinate system, R indicates an orthogonal rotation matrix, and $f_x$ and $f_y$ indicate focal lengths of the camera in an x direction and in a y direction. $u_0$ and $v_0$ indicate a center of imaging (that is, an intersection between an optical axis and a photosensitive surface of a photosensitive component in the camera).

In some embodiments of the present invention, if the first image is a film photograph, the mapping the M characteristic points included in the first image into the first three-dimensional spatial coordinate system according to an internal parameter and an external parameter of the camera may include: mapping the M characteristic points included in the first image into the first three-dimensional spatial coordinate system according to the internal parameter and the external parameter of the camera and a uniform scaling parameter z from a photosensitive component of the camera to the first image.

For example, if the external parameter of the camera is ($R=[R_x, R_y, R_z]$, $T=(T_x, T_y, T_z)$), the internal parameter of the camera is ($f_x$, $f_y$, $u_0$, $v_0$).

A mapping relationship between coordinates ($u_p$, $v_p$) of any characteristic point of the M characteristic points included in the first image and coordinates ($x_w$, $y_w$, $z_w$) of a three-dimensional space point obtained by mapping the characteristic point into the first three-dimensional spatial coordinate system is shown in the following formula 2:

$$\begin{bmatrix} u_p \\ v_p \\ 1 \end{bmatrix} = z \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix}, \quad \text{(formula 2)}$$

where $x_w$, $y_w$, and $z_w$ in the formula indicate a coordinate point in a world coordinate system. T indicates the origin of the world coordinate system, R indicates an orthogonal rotation matrix, $f_x$ and $f_y$ indicate focal lengths of the camera in an x direction and in a y direction, $u_0$ and $v_0$ indicate a center of imaging (that is, an intersection between an optical axis and a photosensitive surface of a photosensitive component in the camera), and z indicates a uniform scaling coefficient from a photosensitive component to a photograph.

In some embodiments of the present invention, images obtained by the camera by respectively photographing the antenna at multiple different positions may also be used to respectively measure and calculate azimuths and/or downtilts of the antenna, an average value of the azimuths of the antenna that are obtained through multiple times of measurement and calculation is used as the obtained azimuth of the antenna, and an average value of the downtilts of the antenna that are obtained through multiple times of measurement and calculation is used as the obtained downtilt of the antenna.

For example, the method for measuring an antenna engineering parameter may further include: obtaining, by the measurement device, a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and mapping, by the measurement device, the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image into the second three-dimensional spatial coordinate system. To reduce computational complexity, in an example of this embodiment of the present invention, an example in which the second mapping photographing direction is parallel to the direction of an axis (for example, a y axis) in the second three-dimensional spatial coordinate system is mainly used. The obtaining a downtilt of the antenna according to a first angle may include: obtaining the downtilt of the antenna according to the first angle and a third angle (for example, obtaining the downtilt of the antenna according to the first angle, obtaining the downtilt of the antenna according to the third angle, and using an average value of the downtilt of the antenna obtained according to the first angle and the downtilt of the antenna obtained according to the third angle as the downtilt of the antenna obtained according to the first angle and the third angle), where the third angle is equal to an included angle between a normal direction of a fourth plane and a third plane, the third plane may be obtained by mapping the first reference plane into the second three-dimensional spatial coordinate system, and the fourth plane may be determined by the N three-dimensional space points.

The obtaining a second image that is obtained by photographing the antenna at a second position includes: obtaining the second image that is obtained by the camera by photographing the antenna at the second position. The mapping the N characteristic points included in the second image into the second three-dimensional spatial coordinate system includes: mapping the N characteristic points included in the second image into the second three-dimensional spatial coordinate system according to an internal parameter and an external parameter of the camera.

For another example, the method for measuring an antenna engineering parameter may further include, for example: obtaining a second image that is obtained by photographing the antenna at a second position (or a third position), where the second image includes at least N characteristic points on the antenna, the N characteristic points are characteristic points on a surface of the antenna, the N characteristic points are in a same plane but are not on a same straight line, and N is a positive integer greater than 2; and mapping the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image into the second three-dimensional spatial coordinate system. To reduce computational complexity, in an example of this embodiment of the present invention, an example in which the second mapping photographing direction is parallel to the direction of an axis (for example, a y axis) in the second three-dimensional spatial coordinate system is mainly used. The obtaining an azimuth of the antenna according to a second angle may include: obtaining the azimuth of the antenna according to the second angle and a fourth angle (for example, the azimuth of the antenna may be obtaining according to the second angle, the azimuth of the antenna may be obtained according to the fourth angle, and an average value of the azimuth of the antenna obtained according to the second angle and the azimuth of the antenna obtained according to the fourth angle is used as the azimuth of the antenna obtained according to the second angle and the fourth angle), where the fourth angle is equal to an included angle between a third reference direction in a third plane and a projection of a normal direction of a fourth plane on the third plane, the third reference direction may be obtained by mapping a first azimuth reference direction into the second three-dimensional spatial coordinate system, the third plane may be obtained by mapping the first reference plane into the second three-dimensional spatial coordinate system, and the fourth plane is determined by the N three-dimensional space points.

The obtaining the second image that is obtained by photographing the antenna at the second position (or the third position) may include: obtaining the second image that is obtained by the camera by photographing the antenna at the second position (or the third position). The mapping the N characteristic points included in the second image into the second three-dimensional spatial coordinate system includes: mapping the N characteristic points included in the second image into the second three-dimensional spatial coordinate system according to an internal parameter and an external parameter of the camera.

It may be understood that, it is assumed that the first reference plane is the horizontal plane, the normal direction of the fourth plane is parallel to a direction obtained by mapping the pointing direction of the antenna into a second three-dimensional coordinate system, and the first azimuth reference direction is a due north direction, so that the downtilt of the antenna obtained according to the third angle is equal to the third angle, and the azimuth of the antenna obtained according to the fourth angle is equal to the fourth angle. It is further assumed that, a third included angle greater than 0 degree exists between the first reference plane and the horizontal plane, the normal direction of the fourth plane is parallel to a direction obtained by mapping the pointing direction of the antenna into a second three-dimensional coordinate system, and a first included angle greater than 0 degree exists between the first azimuth reference direction and a due north direction, so that geometric calibration may be performed on the third angle according to the third included angle to obtain the downtilt of the antenna (the downtilt of the antenna may be equal to the third angle plus/minus the third included angle), and geometric calibration may be performed on the fourth angle according to the first included angle to obtain the azimuth of the antenna (the azimuth of the antenna is equal to the fourth angle plus/minus the first included angle). The rest can be obtained through deduction, for a manner of performing geometric calibration on the third angle to obtain the downtilt of the antenna in another scenario, details are no longer described herein, and for a manner of performing geometric calibration on the fourth angle to obtain the azimuth of the antenna in another scenario, details are no longer described herein.

It may be understood that, the antenna may include k characteristic points, and the N characteristic points may be some or all of the characteristic points of the k characteristic points. An intersection set between the N characteristic points and the M characteristic points may be an empty set or a nonempty set.

It may be understood that, an average value of azimuths of the antenna that are obtained through more times of measurement and calculation may also be calculated, and the average value is used as the obtained azimuth of the antenna; an average value of downtilts of the antenna that are obtained through more times of measurement and calculation may also be calculated, and the average value is used as the obtained downtilt of the antenna. A specific manner is no longer described in detail herein.

It may be understood that, the first position, the second position, and the third position are different positions, and images obtained by photographing a same antenna at different positions help to obtain an antenna engineering parameter more accurately.

It may be understood that, the solution of the foregoing steps in this embodiment of the present invention may be specifically implemented on a terminal device such as a computer, a tablet computer, or a smartphone.

As can be seen, in this embodiment, a measurement device obtains a first image that is obtained by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system, to obtain M three-dimensional space points that are in the first three-dimensional spatial coordinate system and that have a mapping relationship with the M characteristic points. In this way, a mapping relationship between a practical scenario and a mathematical model is established, and a photographing direction of photographing the first image is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that in the solution in this embodiment of the present invention, a photograph of a practical scenario is used to establish a mapping relationship between a practical scenario and a mathematical model, so as to calculate an engineering parameter of an antenna by using such a mathematical model. Compared with an existing manner of on-site manual measurement, the solution provided in this embodiment of the present invention helps to improve precision of an obtained antenna engineering parameter, thereby providing a basis for improvement of reception and transmission performance of a signal. Moreover, because basically only a photograph of an antenna needs to be photographed and used as input, such a solution also helps to greatly reduce difficulty of measuring an antenna engineering parameter.

To better understand and implement the foregoing technical solution in this embodiment of the present invention, several application scenarios are used as examples below for description.

Referring to FIG. 3, FIG. 3 is a schematic flowchart of another method for measuring an antenna engineering parameter according to another embodiment of the present invention. In the solution shown in FIG. 3, a terminal device (a portable terminal device such as a mobile phone or a tablet computer) cooperates with a remote measurement device (a server is used as an example below) to implement measurement on an antenna engineering parameter. The another method for measuring an antenna engineering parameter according to the another embodiment of the present invention may include the following content:

301: A terminal device obtains a first image that is obtained by a camera in the terminal device by photographing an antenna at a first position.

The first image includes at least M characteristic points on the antenna, the M characteristic points are characteristic points on a surface of the antenna, the M characteristic points are in a same plane but are not on a same straight line, and M is a positive integer greater than 2.

It may be understood that, the antenna may include k characteristic points, and the M characteristic points may be some or all of the characteristic points of the k characteristic points.

302: The terminal device sends the first image to a server.

303: The server receives the first image that is obtained by the camera in the terminal device by photographing the antenna at the first position, and maps the M characteristic points included in the first image into a first three-dimensional spatial coordinate system according to an internal parameter and an external parameter of the camera, to obtain M three-dimensional space points that are in the first three-dimensional spatial coordinate system and that have a mapping relationship with the M characteristic points.

A first mapping photographing direction may be parallel to the direction of an axis in the first three-dimensional spatial coordinate system, or an included angle having a specified angle exists between a first mapping photographing direction and the direction of an axis in the first three-dimensional spatial coordinate system, and the first mapping photographing direction is obtained by mapping a photographing direction of photographing the first image by the camera into the first three-dimensional spatial coordinate system. To reduce computational complexity, in an example of this embodiment of the present invention, an example in which the first mapping photographing direction is parallel to the direction of an axis (for example, a y axis) in the first three-dimensional spatial coordinate system is mainly used.

304: The server obtains a downtilt of the antenna according to a first angle and/or obtains an azimuth of the antenna according to a second angle. The second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

Further, if necessary, the server may further feed back the obtained downtilt of the antenna and/or the obtained azimuth of the antenna to the terminal device.

In some embodiments of the present invention, the first azimuth reference direction may be, for example, a due north direction or a due south direction, or a first included angle greater than 0 degree exists between the first azimuth reference direction and a due north direction (that is, the first azimuth reference direction can be determined according to the due north direction and the first included angle), or a second included angle greater than 0 degree exists between the first azimuth reference direction and a due south direction (that is, the first azimuth reference direction can be determined according to the due south direction and the second included angle). Similarly, the first azimuth reference direction may also be, for example, a due east direction or a due west direction, or a fifth included angle greater than 0 degree exists between the first azimuth reference direction and a due east direction (that is, the first azimuth reference direction can be determined according to the due east direction and the fifth included angle), or a sixth included angle greater than 0 degree exists between the first azimuth reference direction and a due east direction (that is, the first azimuth reference direction can be determined according to the due west direction and the sixth included angle).

In some embodiments of the present invention, the first reference plane may be a horizontal plane, or a third included angle greater than 0 degree exists between the first reference plane and a horizontal plane (that is, the first reference plane can be determined according to the horizontal plane and the third included angle). Similarly, the first reference plane may also be a vertical plane, or a seventh included angle greater than 0 degree exists between the first reference plane and a vertical plane (that is, the first reference plane can be determined according to the vertical plane and the seventh included angle).

For the terminal device (such as a smartphone or a tablet computer), the terminal device may determine a due north direction or a due south direction by using a magnetic flux sensor, a compass, or the like in the terminal device. The terminal device may also obtain a gravity direction by using a gravity sensor, and a vertical plane of the gravity direction is the horizontal plane. Alternatively, a gravity direction, a due north direction, or the like may be determined by using some reference objects in the photographed image. For example, an antenna pole is usually perpendicular to a ground surface. Therefore, a vertical plane may be determined according to a pointing direction of an antenna pole. When the vertical plane is determined, the horizontal plane is determined. The horizontal plane may be mapped into a three-dimensional coordinate system and used as a reference plane. For example, the first reference plane in step 103 may be the horizontal plane, and the first plane may be obtained by mapping the horizontal plane into the first three-dimensional spatial coordinate system. It may be understood that, a scenario in which a reference direction or a reference plane is determined by using another reference object may be similar thereto.

In some embodiments of the present invention, the normal direction of the second plane may be, for example, parallel to a direction obtained by mapping a pointing direction of the antenna into a first three-dimensional coordinate system. Alternatively, a fourth included angle greater than 0 degree exists between the normal direction of the second plane and the direction obtained by mapping the pointing direction of the antenna into the first three-dimensional coordinate system (that is, the direction obtained by mapping the pointing direction of the antenna into the first three-dimensional coordinate system is determined according to the normal direction of the second plane and the fourth included angle).

To better understand the pointing direction of the antenna, pointing directions of several types of antennas are described below by using examples with reference to the accompanying drawings.

In some embodiments of the present invention, if the first image is a digital photograph, the external parameter of the camera is (R=[Rx, Ry, Rz], T=(Tx, Ty, Tz));

the internal parameter of the camera is (fx, fy, u0, v0); and a mapping relationship between pixel coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 1.

In some embodiments of the present invention, if the first image is a film photograph, the mapping the M characteristic points included in the first image into the first three-dimensional spatial coordinate system according to an internal parameter and an external parameter of the camera may include: mapping the M characteristic points included in the first image into the first three-dimensional spatial coordinate system according to the internal parameter and the external parameter of the camera and a uniform scaling parameter z from a photosensitive component of the camera to the first image.

For example, if the external parameter of the camera is (R=[Rx, Ry, Rz], T=(Tx, Ty, Tz)), the internal parameter of the camera is (fx, fy, u0, v0); and a mapping relationship between coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 2.

In some embodiments of the present invention, the terminal device may also use images obtained by the camera by respectively photographing the antenna at multiple different positions to respectively measure and calculate azimuths and/or downtilts of the antenna, use an average value of the azimuths of the antenna that are obtained through multiple times of measurement and calculation as the obtained azimuth of the antenna, and use an average value of the downtilts of the antenna that are obtained through multiple times of measurement and calculation as the obtained downtilt of the antenna.

For example, the server may further obtain a second image that is obtained by the camera in the terminal device by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system according to an internal parameter and an external parameter of the camera, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image by the camera into the second three-dimensional spatial coordinate system. To reduce computational complexity, in an example of this embodiment, an example in which the second mapping photographing direction is parallel to the direction of an axis (for example, a y axis) in the second three-dimensional spatial coordinate system is mainly used. The obtaining a downtilt of the antenna according to a first angle may include: obtaining the downtilt of the antenna according to the first angle and a third angle, where the third angle is equal to an included angle between a normal direction of a fourth plane and a third plane, the third plane may be obtained by mapping the first reference plane into the second three-dimensional spatial coordinate system, and the fourth plane may be determined by the N three-dimensional space points.

For another example, the server may further obtain a second image that is obtained by the camera in the terminal device by photographing the antenna at a second position (or a third position), where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system according to an internal parameter and an external parameter of the camera, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image by the camera into the second three-dimensional spatial coordinate system. To simplify computation, in an example of this embodiment of the present invention, an example in which the second mapping photographing direction is parallel to the direction of an axis (for example, a y axis) in the second three-dimensional spatial coordinate system is mainly used. The obtaining an azimuth of the antenna according to a second angle may specifically include: obtaining the azimuth of the antenna according to the second angle and a fourth angle, where the fourth angle is equal to an included angle between a third reference direction in a third plane and a projection of a normal direction of a fourth plane on the third plane, the third reference direction may be obtained by mapping a first azimuth reference direction into the second three-dimensional spatial coordinate system, the third plane may be obtained by mapping the first reference plane into the second three-dimensional spatial coordinate system, and the fourth plane is determined by the N three-dimensional space points.

It may be understood that, the antenna may include k characteristic points, and the M characteristic points may be some or all of the characteristic points of the k characteristic points. An intersection set between the N characteristic points and the M characteristic points may be an empty set or a nonempty set.

It may be understood that, the server may also calculate an average value of azimuths of the antenna that are obtained through more times of measurement and calculation, and use the average value as the obtained azimuth of the antenna; or may calculate an average value of downtilts of the antenna that are obtained through more times of measurement and calculation, and use the average value as the obtained downtilt of the antenna. A specific manner is no longer described in detail herein.

It may be understood that, the first position, the second position, and the third position are different positions, and images obtained by photographing a same antenna at different positions help to obtain an antenna engineering parameter more accurately.

Descriptions are provided below by using a more specific scenario with reference to the accompanying drawings.

Referring to FIG. 4-*a*, it is assumed that FIG. 4-*a* is the first image that is obtained by the camera in the terminal device by photographing the antenna at the first position, where star-shaped symbols are positions of marked characteristic points. FIG. 4-*b* may be regarded as an equivalent geometric pattern of the antenna in the first image, where characteristic points, that is, a characteristic point A1, a characteristic point A2, and a characteristic point A3 that are located on a same plane are provided on the antenna.

The server may map the M characteristic points included in the first image into the first three-dimensional spatial coordinate system according to an internal parameter and an external parameter of the camera, to obtain three three-dimensional space points that are in the first three-dimensional spatial coordinate system and that have a mapping relationship with the three characteristic points. For example, as shown in FIG. 4-*c*, it is assumed that a direction of a y axis in the first three-dimensional spatial coordinate system is parallel to the first mapping photographing direction, where the first mapping photographing direction is a direction obtained by mapping a photographing direction of the first image into the first three-dimensional spatial coordinate system. It is assumed that the characteristic points A1, A2, and A3 are mapped into the first three-dimensional spatial coordinate system, to obtain three three-dimensional space points A1', A2', and A3' that are in the first three-dimensional spatial coordinate system and that have a mapping relationship with the characteristic points A1, A2, and A3.

As shown in FIG. 4-*d*, FIG. 4-*d* shows a characteristic plane that is determined by the three-dimensional space points A1', A2', and A3' together (the characteristic plane is, for example, the second plane in the foregoing embodiment). The characteristic plane is a plane indicated by a slant-line shadow in FIG. 4-*d*, and a normal direction of the characteristic plane may be a direction pointed by a dashed-line arrow shown in FIG. 4-*d*. Herein, an example in which the normal direction of the characteristic plane is parallel to a direction obtained by mapping the pointing direction of the antenna into the first three-dimensional coordinate system is used. A scenario in which the fourth included angle greater than 0 degree exists between the normal direction of the second plane and the direction obtained by mapping the pointing direction of the antenna into the first three-dimensional coordinate system can be obtained through deduction.

FIG. 4-*e* shows a first reference direction obtained by mapping the first azimuth reference direction into the first three-dimensional coordinate system. An example in which the first azimuth reference direction is a due north direction is used. For the terminal device (such as a smartphone or a tablet computer), the terminal device may determine a due north direction or a due south direction by using a magnetic flux sensor, a compass, or the like in the terminal device. The terminal device may obtain a gravity direction by using a gravity sensor, and a vertical plane of the gravity direction is the horizontal plane. Alternatively, a gravity direction, a due north direction, or the like may be determined by using some reference objects in the photographed image.

Referring to FIG. 4-*f*, FIG. 4-*f* shows the first plane that is obtained by mapping the first reference plane into the first three-dimensional coordinate system, where an example in which the first reference plane is the horizontal plane is used, and the first plane is the plane indicated by the point shadow in FIG. 4-*f*.

Referring to FIG. 4-*g*, a projection of a normal direction s3 of the characteristic plane on the first plane is s2, and an azimuth $\angle\beta$ of the antenna is equal to an included angle between the projection s2 of the normal direction s3 of the characteristic plane on the first plane and a first reference direction s5. A downtilt $\angle\alpha$ of the antenna is equal to an included angle between the normal direction s3 of the characteristic plane and the projection $\Omega$ of the normal direction s3 of the characteristic plane on the first plane. $\angle\gamma$ is an included angle between the first mapping photographing direction y and the first reference direction s5.

As can be seen from above, after the first plane is determined in the first three-dimensional coordinate system, the downtilt $\angle\alpha$ of the antenna may be determined according to the characteristic plane. After the first plane and the first reference direction are determined in the first three-dimensional coordinate system, the azimuth $\angle\beta$ of the antenna may be determined according to the characteristic plane.

As can be seen, in this embodiment, a server obtains a first image that is obtained by a camera by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system according to an internal parameter and an external parameter of the camera, to obtain M three-dimensional space points that are in the first three-dimensional spatial coordinate system and that have a mapping relationship with the M characteristic points. In this way, a mapping relationship between a practical scenario and a mathematical model is established, and a photographing direction of photographing the first image by the camera is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that in the solution in this embodiment of the present invention, a photograph of a practical scenario is used to establish a mapping relationship between a practical scenario and a mathematical model, so as to calculate an engineering parameter of an antenna by using such a mathematical model. Compared with an existing manner of on-site manual measurement, the solution provided in this embodiment of the present invention helps to improve precision of an obtained antenna engineering parameter, thereby providing a basis for improvement of reception and transmission performance of a signal. Moreover, because basically only a photograph of an antenna needs to be photographed and used as input, such a solution also helps to greatly reduce difficulty of measuring an antenna engineering parameter.

Referring to FIG. 5, FIG. 5 is a schematic flowchart of another method for measuring an antenna engineering parameter according to another embodiment of the present invention. In the solution shown in FIG. 5, a terminal device cooperates with a remote measurement device (a server is used as an example) to implement measurement on an antenna engineering parameter. The another method for measuring an antenna engineering parameter according to the another embodiment of the present invention may include the following content:

501: A terminal device obtains a first image that is obtained by a camera in the terminal device by photographing an antenna at a first position.

The first image includes at least M characteristic points on the antenna, the M characteristic points are characteristic points on a surface of the antenna, the M characteristic points are in a same plane but are not on a same straight line, and M is a positive integer greater than 2.

It may be understood that, the antenna may include k characteristic points, and the M characteristic points may be some or all of the characteristic points of the k characteristic points.

502: The terminal device maps the M characteristic points included in the first image into a first three-dimensional spatial coordinate system according to an internal parameter and an external parameter of the camera, to obtain M three-dimensional space points that are in the first three-dimensional spatial coordinate system and that have a mapping relationship with the M characteristic points.

A first mapping photographing direction may be parallel to the direction of an axis in the first three-dimensional spatial coordinate system, or an included angle having a specified angle exists between a first mapping photographing direction and the direction of an axis in the first three-dimensional spatial coordinate system, and the first mapping photographing direction is obtained by mapping a photographing direction of photographing the first image by the camera into the first three-dimensional spatial coordinate system. To reduce computational complexity, in an example of this embodiment of the present invention, an example in which the first mapping photographing direction is parallel to the direction of an axis (for example, a y axis) in the first three-dimensional spatial coordinate system is mainly used.

503: The terminal device obtains a downtilt of the antenna according to a first angle and/or obtains an azimuth of the antenna according to a second angle, where the second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

Further, if necessary, the terminal device may further feed back the obtained downtilt of the antenna and/or the obtained azimuth of the antenna to a server.

In some embodiments of the present invention, the first azimuth reference direction may be, for example, a due north direction or a due south direction, or a first included angle greater than 0 degree exists between the first azimuth reference direction and a due north direction (that is, the first azimuth reference direction can be determined according to the due north direction and the first included angle), or a second included angle greater than 0 degree exists between the first azimuth reference direction and a due south direction (that is, the first azimuth reference direction can be determined according to the due south direction and the second included angle). Similarly, the first azimuth reference direction may also be, for example, a due east direction or a due west direction, or a fifth included angle greater than 0 degree exists between the first azimuth reference direction and a due east direction (that is, the first azimuth reference direction can be determined according to the due east direction and the fifth included angle), or a sixth included angle greater than 0 degree exists between the first azimuth reference direction and a due east direction (that is, the first azimuth reference direction can be determined according to the due west direction and the sixth included angle).

In some embodiments of the present invention, the first reference plane may be a horizontal plane, or a third included angle greater than 0 degree exists between the first reference plane and a horizontal plane (that is, the first reference plane can be determined according to the horizontal plane and the third included angle). Similarly, the first reference plane may also be a vertical plane, or a seventh included angle greater than 0 degree exists between the first reference plane and a vertical plane (that is, the first reference plane can be determined according to the vertical plane and the seventh included angle).

For the terminal device (such as a smartphone or a tablet computer), the terminal device may determine a due north direction or a due south direction by using a magnetic flux sensor, a compass, or the like in the terminal device. The terminal device may also obtain a gravity direction by using a gravity sensor, and a vertical plane of the gravity direction is the horizontal plane. Alternatively, a gravity direction, a due north direction, or the like may be determined by using some reference objects in the photographed image. For example, an antenna pole is usually perpendicular to a ground surface. Therefore, a vertical plane may be determined according to a pointing direction of an antenna pole. When the vertical plane is determined, the horizontal plane is determined. The horizontal plane may be mapped into a three-dimensional coordinate system and used as a reference plane. For example, the first reference plane in step 103 may be the horizontal plane, and the first plane may be obtained by mapping the horizontal plane into the first three-dimensional spatial coordinate system. It may be understood that, a scenario in which a reference direction or a reference plane is determined by using another reference object may be similar thereto.

In some embodiments of the present invention, the normal direction of the second plane may be, for example, parallel to a direction obtained by mapping a pointing direction of the antenna into a first three-dimensional coordinate system. Alternatively, a fourth included angle greater than 0 degree exists between the normal direction of the second plane and the direction obtained by mapping the pointing direction of the antenna into the first three-dimensional coordinate system (that is, the direction obtained by mapping the pointing direction of the antenna into the first three-dimensional coordinate system is determined according to the normal direction of the second plane and the fourth included angle).

To better understand the pointing direction of the antenna, pointing directions of several types of antennas are described below by using examples with reference to the accompanying drawings.

In some embodiments of the present invention, if the first image is a digital photograph, the external parameter of the camera is (R=[Rx, Ry, Rz], T=(Tx, Ty, Tz)); the internal parameter of the camera is (fx, fy, u0, v0); and a mapping relationship between pixel coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 1.

In some embodiments of the present invention, if the first image is a film photograph, the mapping the M characteristic points included in the first image into the first three-dimensional spatial coordinate system according to an internal parameter and an external parameter of the camera may include: mapping the M characteristic points included in the first image into the first three-dimensional spatial coordinate system according to the internal parameter and the external parameter of the camera and a uniform scaling parameter z from a photosensitive component of the camera to the first image.

For example, if the external parameter of the camera is (R=[Rx, Ry, Rz], T=(Tx, Ty, Tz)), the internal parameter of the camera is (fx, fy, u0, v0); and a mapping relationship between coordinates $(u_p, u_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 2.

In some embodiments of the present invention, the terminal device may also use images obtained by the camera by respectively photographing the antenna at multiple different positions to respectively measure and calculate azimuths and/or downtilts of the antenna, use an average value of the azimuths of the antenna that are obtained through multiple times of measurement and calculation as the obtained azimuth of the antenna, and use an average value of the downtilts of the antenna that are obtained through multiple times of measurement and calculation as the obtained downtilt of the antenna.

For example, the terminal device may further obtain a second image that is obtained by the camera by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system according to an internal parameter and an external parameter of the camera, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image by the camera into the second three-dimensional spatial coordinate system. To reduce computational complexity, in an example of this embodiment, an example in which the second mapping photographing direction is parallel to the direction of an axis (for example, a y axis) in the second three-dimensional spatial coordinate system is mainly used. For example, the obtaining a downtilt of the antenna according to a first angle may include: obtaining the downtilt of the antenna according to the first angle and a third angle, where the third angle is equal to an included angle between a normal direction of a fourth plane and a third plane, the third plane may be obtained by mapping the first reference plane into the second three-dimensional spatial coordinate system, and the fourth plane may be determined by the N three-dimensional space points.

For another example, the terminal device may further obtain a second image that is obtained by the camera by photographing the antenna at a second position (or a third position), where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system according to an internal parameter and an external parameter of the camera, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image by the camera into the second three-dimensional spatial coordinate system. To reduce computational complexity, in an example of this embodiment of the present invention, an example in which the second mapping photographing direction is parallel to the direction of an axis (for example, a y axis) in the second three-dimensional spatial coordinate system is mainly used. The obtaining an azimuth of the antenna according to a second angle may specifically include: obtaining the azimuth of the antenna according to the second angle and a fourth angle, where the fourth angle is equal to an included angle between a third reference direction in a third plane and a projection of a normal direction of a fourth plane on the third plane, the third reference direction may be obtained by mapping a first azimuth reference direction into the second three-dimensional spatial coordinate system, the third plane may be obtained by mapping the first reference plane into the second three-dimensional spatial coordinate system, and the fourth plane is determined by the N three-dimensional space points.

It may be understood that, the antenna may include k characteristic points, and the M characteristic points may be some or all of the characteristic points of the k characteristic points. An intersection set between the N characteristic points and the M characteristic points may be an empty set or a nonempty set.

It may be understood that, the terminal device may also calculate an average value of azimuths of the antenna that are obtained through more times of measurement and calculation, and use the average value as the obtained azimuth of the antenna; or may calculate an average value of downtilts of the antenna that are obtained through more times of measurement and calculation, and use the average value as the obtained downtilt of the antenna. A specific manner is no longer described in detail herein.

It may be understood that, the first position, the second position, and the third position are different positions, and images obtained by photographing a same antenna at different positions help to obtain an antenna engineering parameter more accurately.

As can be seen, in this embodiment, a terminal device obtains a first image that is obtained by a camera by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system according to an internal parameter and an external parameter of the camera, to obtain M three-dimensional space points that are in the first three-dimensional spatial coordinate system and that have a mapping relationship with the M characteristic points. In this way, a mapping relationship between a practical scenario and a mathematical model is established, and a photographing direction of photographing the first image by the camera is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that in the solution in this embodiment of the present invention, a photograph of a practical scenario is used to establish a mapping relationship between a practical scenario and a mathematical model, so as to calculate an engineering parameter of an antenna by using such a mathematical model. Compared with an existing manner of on-site manual measurement, the solution provided in this embodiment of the present invention helps to improve precision of an obtained antenna engineering parameter, thereby providing a basis for improvement of reception and transmission performance of a signal. Moreover, because basically only a photograph of an antenna needs to be photographed and used as input, such a solution also helps to greatly reduce difficulty of measuring an antenna engineering parameter.

To better implement the foregoing solutions of the embodiments of the present invention, related apparatuses used to implement the foregoing solutions are further provided below.

Figure 6:
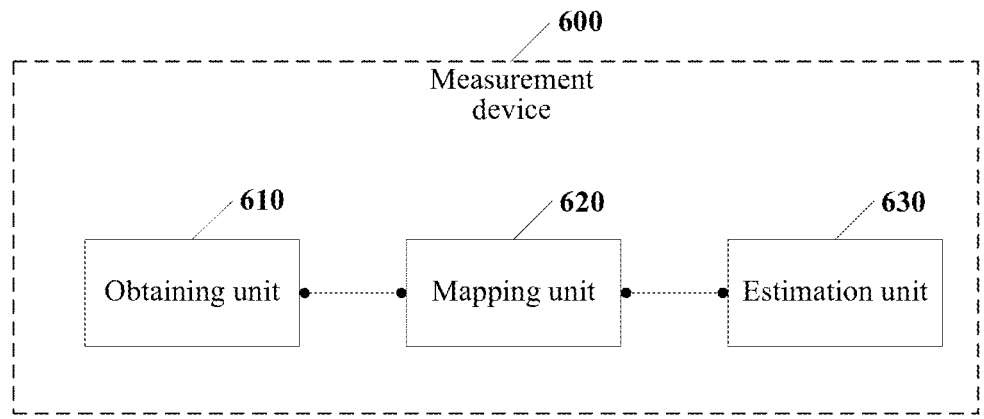
FIG. 6 is a schematic diagram of an apparatus for obtaining an antenna engineering parameter according to an embodiment of the present invention.

Referring to FIG. 6, an embodiment of the present invention provides an apparatus 600 for measuring an antenna engineering parameter, where the apparatus 600 includes: an obtaining unit 610, a mapping unit 620, and an estimation unit 630.

The obtaining unit 610 is configured to obtain a first image that is obtained by photographing an antenna at a first position.

For example, the obtaining unit 610 may be specifically configured to obtain the first image that is obtained by a camera by photographing the antenna at the first position.

The first image includes at least M characteristic points on the antenna, the M characteristic points are characteristic points on a surface of the antenna, the M characteristic points are in a same plane but are not on a same straight line, and M is a positive integer greater than 2.

It may be understood that, the antenna may include k characteristic points, and the M characteristic points may be some or all of the characteristic points of the k characteristic points. A position relationship between a plane defined by these characteristic points and a pointing direction of the antenna may be determined. For example, the position relationship between the plane defined by these characteristic points and the pointing direction of the antenna may be a parallel relationship, a perpendicular relationship, or a relationship of another specific angle.

The mapping unit 620 is configured to map the M characteristic points included in the first image into a first three-dimensional spatial coordinate system, to obtain M three-dimensional space points that are in the first three-dimensional spatial coordinate system and that have a mapping relationship with the M characteristic points, where a first mapping photographing direction is parallel to a direction of an axis in the first three-dimensional spatial coordinate system, or an included angle having a specified angle exists between a first mapping photographing direction and a direction of an axis in the first three-dimensional spatial coordinate system, and the first mapping photographing direction is obtained by mapping a photographing direction of photographing the first image into the first three-dimensional spatial coordinate system.

In some embodiments of the present invention, the mapping unit 620 may be specifically configured to map the M characteristic points included in the first image into the first three-dimensional spatial coordinate system according to an internal parameter and an external parameter of the camera, to obtain M three-dimensional space points that are in the first three-dimensional spatial coordinate system and that have a mapping relationship with the M characteristic points.

The estimation unit 630 is configured to: obtain a downtilt of the antenna according to a first angle and/or obtain an azimuth of the antenna according to a second angle, where the second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

In some embodiments of the present invention, the first azimuth reference direction may be, for example, a due north direction or a due south direction, or a first included angle greater than 0 degree exists between the first azimuth reference direction and a due north direction (that is, the first azimuth reference direction can be determined according to the due north direction and the first included angle), or a second included angle greater than 0 degree exists between the first azimuth reference direction and a due south direction (that is, the first azimuth reference direction can be determined according to the due south direction and the second included angle). Similarly, the first azimuth reference direction may also be, for example, a due east direction or a due west direction, or a fifth included angle greater than 0 degree exists between the first azimuth reference direction and a due east direction (that is, the first azimuth reference direction can be determined according to the due east direction and the fifth included angle), or a sixth included angle greater than 0 degree exists between the first azimuth reference direction and a due east direction (that is, the first azimuth reference direction can be determined according to the due west direction and the sixth included angle).

In some embodiments of the present invention, the first reference plane may be a horizontal plane, or a third included angle greater than 0 degree exists between the first reference plane and a horizontal plane (that is, the first reference plane can be determined according to the horizontal plane and the third included angle). Similarly, the first reference plane may also be a vertical plane, or a seventh included angle greater than 0 degree exists between the first reference plane and a vertical plane (that is, the first reference plane can be determined according to the vertical plane and the seventh included angle).

It is assumed that the apparatus 600 for measuring an antenna engineering parameter is a terminal device. For the terminal device (such as a smartphone or a tablet computer), the terminal device may determine a due north direction or a due south direction by using a magnetic flux sensor, a compass, or the like in the terminal device. The terminal device may also obtain a gravity direction by using a gravity sensor, and a vertical plane of the gravity direction is the horizontal plane. Alternatively, a gravity direction, a due north direction, or the like may be determined by using some reference objects in the photographed image. For example, an antenna pole is usually perpendicular to a ground surface. Therefore, a vertical plane may be determined according to a pointing direction of an antenna pole. When the vertical plane is determined, the horizontal plane is determined. The horizontal plane may be mapped into a three-dimensional coordinate system and used as a reference plane, for example, the first reference plane may be the horizontal plane, and the first plane may be obtained by mapping the horizontal plane into the first three-dimensional spatial coordinate system. It may be understood that, a scenario in which a reference direction or a reference plane is determined by using another reference object may be similar thereto.

In some embodiments of the present invention, the normal direction of the second plane may be, for example, parallel to a direction obtained by mapping the pointing direction of the antenna into a first three-dimensional coordinate system. Alternatively, a fourth included angle greater than 0 degree exists between the normal direction of the second plane and the direction obtained by mapping the pointing direction of the antenna into the first three-dimensional coordinate system (that is, the direction obtained by mapping the pointing direction of the antenna into the first three-dimensional coordinate system is determined according to the normal direction of the second plane and the fourth included angle).

In some embodiments of the present invention, if the first image is a digital photograph, the external parameter of the camera is (R=[Rx, Ry, Rz], T=(Tx, Ty, Tz)); the internal parameter of the camera is (fx, fy, u0, v0); and a mapping relationship between pixel coordinates $(u_p, u_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 1.

In some embodiments of the present invention, if the first image is a film photograph, the mapping unit 620 is specifically configured to map the M characteristic points included in the first image into the first three-dimensional spatial coordinate system according to an internal parameter and an external parameter of the camera and a uniform scaling parameter z from a photosensitive component of the camera to the first image.

The external parameter of the camera is (R=[Rx, Ry, Rz], T=(Tx, Ty, Tz)); the internal parameter of the camera is (fx, fy, u0, v0); and a mapping relationship between coordinates $(u_p, u_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 2.

It may be understood that, it is assumed that the first reference plane is the horizontal plane, a direction obtained by mapping the pointing direction of the antenna into the first three-dimensional coordinate system may be parallel to the normal direction of the second plane, and the first azimuth reference direction is a due north direction, so that the downtilt of the antenna obtained according to the first angle is equal to the first angle, and the azimuth of the antenna obtained according to the second angle is equal to the second angle. It is further assumed that, a third included angle greater than 0 degree exists between the first reference plane and the horizontal plane, a direction obtained by mapping the pointing direction of the antenna into the first three-dimensional coordinate system may be parallel to the normal direction of the second plane, and a first included angle greater than 0 degree exists between the first azimuth reference direction and a due north direction, so that geometric calibration may be performed on the first angle according to the third included angle to obtain the downtilt of the antenna (the downtilt of the antenna is equal to the first angle plus/minus the third included angle), and geometric calibration may be performed on the second angle according to the first included angle to obtain the azimuth of the antenna (the azimuth of the antenna is equal to the second angle plus/minus the first included angle). The rest can be obtained through deduction, for a manner of performing geometric calibration on the first angle to obtain the downtilt of the antenna in another scenario, details are no longer described herein, and for a manner of performing geometric calibration on the second angle to obtain the azimuth of the antenna in another scenario, details are no longer described herein.

In some embodiments of the present invention, the obtaining unit 610 may be further configured to obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2.

The mapping unit 620 may be further configured to map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system.

In the aspect of obtaining a downtilt of the antenna according to a first angle, the estimation unit 630 may be specifically configured to obtain the downtilt of the antenna according to the first angle and a third angle, where the third angle is equal to an included angle between a normal direction of a fourth plane and a third plane, the third plane is obtained by mapping the first reference plane into the second three-dimensional spatial coordinate system, and the fourth plane is determined by the N three-dimensional space points.

In some embodiments of the present invention, the obtaining unit 610 is further configured to obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2.

The mapping unit 620 is further configured to map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system.

In the aspect of obtaining an azimuth of the antenna according to a second angle, the estimation unit 630 is specifically configured to obtain the azimuth of the antenna according to the second angle and a fourth angle, where the fourth angle is equal to an included angle between a first reference direction in a third plane and a projection of a normal direction of a fourth plane on the third plane, the first reference direction is obtained by mapping the first azimuth reference direction into the first three-dimensional spatial coordinate system, the third plane is obtained by mapping the first reference plane into the second three-dimensional spatial coordinate system, and the fourth plane is determined by the N three-dimensional space points.

In some embodiments of the present invention, in the aspect of obtaining a second image that is obtained by photographing the antenna at a second position, the obtaining unit 610 is specifically configured to obtain the second image that is obtained by the camera by photographing the antenna at the second position.

In some embodiments of the present invention, in the aspect of mapping the N characteristic points included in the second image into a second three-dimensional spatial coordinate system, the mapping unit 620 may be specifically configured to map the N characteristic points included in the second image into the second three-dimensional spatial coordinate system according to an internal parameter and an external parameter of the camera.

It may be understood that, it is assumed that the first reference plane is the horizontal plane, the normal direction of the fourth plane is parallel to a direction obtained by mapping the pointing direction of the antenna into a second three-dimensional coordinate system, and the first azimuth reference direction is a due north direction, so that the downtilt of the antenna obtained according to the third angle is equal to the third angle, and the azimuth of the antenna obtained according to the fourth angle is equal to the fourth angle. It is further assumed that, a third included angle greater than 0 degree exists between the first reference plane and the horizontal plane, the normal direction of the fourth plane is parallel to a direction obtained by mapping the pointing direction of the antenna into a second three-dimensional coordinate system, and a first included angle greater than 0 degree exists between the first azimuth reference direction and a due north direction, so that geometric calibration may be performed on the third angle according to the third included angle to obtain the downtilt of the antenna (the downtilt of the antenna may be equal to the third angle plus/minus the third included angle), and geometric calibration may be performed on the fourth angle according to the first included angle to obtain the azimuth of the antenna (the azimuth of the antenna is equal to the fourth angle plus/minus the first included angle). The rest can be obtained through deduction, for a manner of performing geometric calibration on the third angle to obtain the downtilt of the antenna in another scenario, details are no longer described herein, and for a manner of performing geometric calibration on the fourth angle to obtain the azimuth of the antenna in another scenario, details are no longer described herein.

It may be understood that, the antenna may include k characteristic points, and the N characteristic points may be some or all of the characteristic points of the k characteristic points. An intersection set between the N characteristic points and the M characteristic points may be an empty set or a nonempty set.

It may be understood that, an average value of azimuths of the antenna that are obtained through more times of measurement and calculation may also be calculated, and the average value is used as the obtained azimuth of the antenna; an average value of downtilts of the antenna that are obtained through more times of measurement and calculation may also be calculated, and the average value is used as the obtained downtilt of the antenna. A specific manner is no longer described in detail herein.

It may be understood that, the first position and the second position are different positions, and images obtained by photographing a same antenna at different positions help to obtain an antenna engineering parameter more accurately.

It may be understood that, functions of functional modules of the apparatus 600 for measuring an antenna engineering parameter in this embodiment may be specifically implemented according to the method in the foregoing method embodiment. For a specific implementation process of the apparatus 600, refer to related descriptions in the foregoing method embodiment, and details are no longer described herein.

As can be seen, the apparatus 600 for measuring an antenna engineering parameter in this embodiment obtains a first image that is obtained by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system, to obtain M three-dimensional space points that are in the first three-dimensional spatial coordinate system and that have a mapping relationship with the M characteristic points. In this way, a mapping relationship between a practical scenario and a mathematical model is established, where a photographing direction of photographing the first image is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that, in the solution in this embodiment, a photograph of a practical scenario is used to establish a mapping relationship between a practical scenario and a mathematical model, so as to calculate an engineering parameter of an antenna by using such a mathematical model. Compared with an existing manner of on-site manual measurement, the solution in this embodiment helps to improve precision of an obtained antenna engineering parameter, thereby providing a basis for improvement of reception and transmission performance of a signal. Moreover, because basically only a photograph of an antenna needs to be photographed and used as input, such a solution also helps to greatly reduce difficulty of measuring an antenna engineering parameter.

Figure 7:
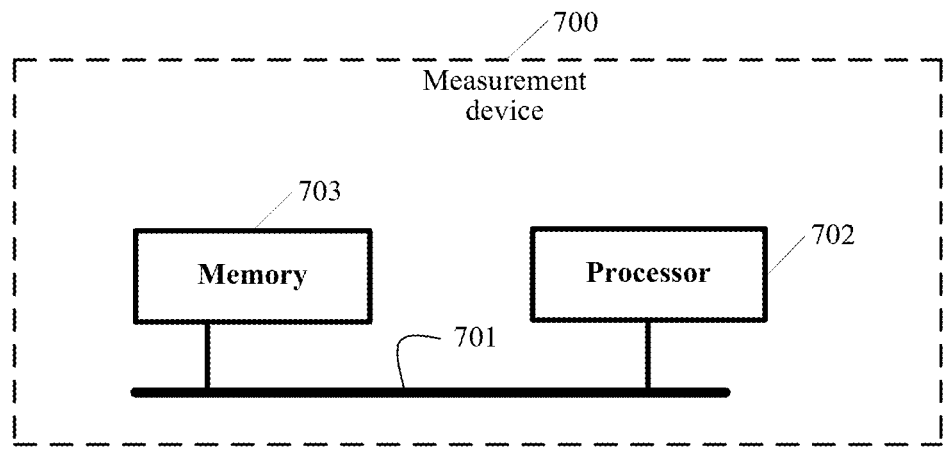
FIG. 7 is a schematic diagram of a measurement device according to an embodiment of the present invention.

Referring to FIG. 7, FIG. 7 is a schematic diagram of a measurement device 700 according to an embodiment of the present invention. The measurement device 700 includes: at least one bus 701, at least one processor 702 connected to the bus 701, and at least one memory 703 connected to the bus 701.

The processor 702 invokes, by using the bus 701, code stored in the memory 703 to: obtain a first image that is obtained by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and map the M characteristic points included in the first image into a first three-dimensional spatial coordinate system, to obtain M three-dimensional space points that are in the first three-dimensional spatial coordinate system and that have a mapping relationship with the M characteristic points, where a first mapping photographing direction is parallel to a direction of an axis in the first three-dimensional spatial coordinate system, or an included angle having a specified angle exists between a first mapping photographing direction and a direction of an axis in the first three-dimensional spatial coordinate system, and the first mapping photographing direction is obtained by mapping a photographing direction of photographing the first image into the first three-dimensional spatial coordinate system; and obtain a downtilt of the antenna according to a first angle and/or obtain an azimuth of the antenna according to a second angle, where the second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

In some embodiments of the present invention, the first azimuth reference direction may be, for example, a due north direction or a due south direction, or a first included angle greater than 0 degree exists between the first azimuth reference direction and a due north direction (that is, the first azimuth reference direction can be determined according to the due north direction and the first included angle), or a second included angle greater than 0 degree exists between the first azimuth reference direction and a due south direction (that is, the first azimuth reference direction can be determined according to the due south direction and the second included angle). Similarly, the first azimuth reference direction may also be, for example, a due east direction or a due west direction, or a fifth included angle greater than 0 degree exists between the first azimuth reference direction and a due east direction (that is, the first azimuth reference direction can be determined according to the due east direction and the fifth included angle), or a sixth included angle greater than 0 degree exists between the first azimuth reference direction and a due east direction (that is, the first azimuth reference direction can be determined according to the due west direction and the sixth included angle).

In some embodiments of the present invention, the first reference plane may be a horizontal plane, or a third included angle greater than 0 degree exists between the first reference plane and a horizontal plane (that is, the first reference plane can be determined according to the horizontal plane and the third included angle). Similarly, the first reference plane may also be a vertical plane, or a seventh included angle greater than 0 degree exists between the first reference plane and a vertical plane (that is, the first reference plane can be determined according to the vertical plane and the seventh included angle).

In some embodiments of the present invention, in the aspect of obtaining a first image that is obtained by photographing an antenna at a first position, the processor 702 is specifically configured to obtain the first image that is obtained by a camera by photographing the antenna at the first position.

In some embodiments of the present invention, in the aspect of mapping the M characteristic points included in the first image into the first three-dimensional spatial coordinate system, the processor 702 is specifically configured to obtain, according to an internal parameter and an external parameter of the camera, the first image that is obtained by the camera by photographing the antenna at the first position.

For a terminal device (such as a smartphone or a tablet computer), the terminal device may determine a due north direction or a due south direction by using a magnetic flux sensor, a compass, or the like in the terminal device. The terminal device may also obtain a gravity direction by using a gravity sensor, and a vertical plane of the gravity direction is the horizontal plane. Alternatively, a gravity direction, a due north direction, or the like may be determined by using some reference objects in the photographed image. For example, an antenna pole is usually perpendicular to a ground surface. Therefore, a vertical plane may be determined according to a pointing direction of an antenna pole. When the vertical plane is determined, the horizontal plane is determined. The horizontal plane may be mapped into a three-dimensional coordinate system and used as a reference plane. For example, the first reference plane may be the horizontal plane, and the first plane may be obtained by mapping the horizontal plane into the first three-dimensional spatial coordinate system. It may be understood that, a scenario in which a reference direction or a reference plane is determined by using another reference object may be similar thereto.

In some embodiments of the present invention, the normal direction of the second plane may be, for example, parallel to a direction obtained by mapping a pointing direction of the antenna into a first three-dimensional coordinate system. Alternatively, a fourth included angle greater than 0 degree exists between the normal direction of the second plane and the direction obtained by mapping the pointing direction of the antenna into the first three-dimensional coordinate system (that is, the direction obtained by mapping the pointing direction of the antenna into the first three-dimensional coordinate system is determined according to the normal direction of the second plane and the fourth included angle).

In some embodiments of the present invention, if the first image is a digital photograph, the external parameter of the camera is (R=[Rx, Ry, Rz], T=(Tx, Ty, Tz)); the internal parameter of the camera is (fx, fy, u0, v0); and a mapping relationship between pixel coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 1.

In some embodiments of the present invention, in the aspect of mapping the M characteristic points included in the first image into the first three-dimensional spatial coordinate system according to an internal parameter and an external parameter of the camera, the processor 702 is specifically configured to map the M characteristic points included in the first image into the first three-dimensional spatial coordinate system according to the internal parameter and the external parameter of the camera and a uniform scaling parameter z from a photosensitive component of the camera to the first image.

In some embodiments of the present invention, if the first image is a film photograph, the external parameter of the camera is (R=[Rx, Ry, Rz], T=(Tx, Ty, Tz)); the internal parameter of the camera is (fx, fy, u0, v0); and a mapping relationship between coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 2.

It may be understood that, it is assumed that the first reference plane is the horizontal plane, a direction obtained by mapping the pointing direction of the antenna into the first three-dimensional coordinate system may be parallel to the normal direction of the second plane, and the first azimuth reference direction is a due north direction, so that the downtilt of the antenna obtained according to the first angle is equal to the first angle, and the azimuth of the antenna obtained according to the second angle is equal to the second angle. It is further assumed that, a third included angle greater than 0 degree exists between the first reference plane and the horizontal plane, a direction obtained by mapping the pointing direction of the antenna into the first three-dimensional coordinate system may be parallel to the normal direction of the second plane, and a first included angle greater than 0 degree exists between the first azimuth reference direction and a due north direction, so that geometric calibration may be performed on the first angle according to the third included angle to obtain the downtilt of the antenna (the downtilt of the antenna is equal to the first angle plus/minus the third included angle), and geometric calibration may be performed on the second angle according to the first included angle to obtain the azimuth of the antenna (the azimuth of the antenna is equal to the second angle plus/minus the first included angle). The rest can be obtained through deduction, for a manner of performing geometric calibration on the first angle to obtain the downtilt of the antenna in another scenario, details are no longer described herein, and for a manner of performing geometric calibration on the second angle to obtain the azimuth of the antenna in another scenario, details are no longer described herein.

In some embodiments of the present invention, the processor 702 may be further configured to: obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image by the camera into the second three-dimensional spatial coordinate system.

In the aspect of obtaining a downtilt of the antenna according to a first angle, the processor 702 is specifically configured to obtain the downtilt of the antenna according to the first angle and a third angle, where the third angle is equal to an included angle between a normal direction of a fourth plane and a third plane, the third plane is obtained by mapping the first reference plane into the second three-dimensional spatial coordinate system, and the fourth plane is determined by the N three-dimensional space points.

In some other embodiments of the present invention, the processor 702 may be further configured to: obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image by the camera into the second three-dimensional spatial coordinate system.

In the aspect of obtaining an azimuth of the antenna according to a second angle, the processor 702 is specifically configured to, obtain the azimuth of the antenna according to the second angle and a fourth angle, where the fourth angle is equal to an included angle between a first reference direction in a third plane and a projection of a normal direction of a fourth plane on the third plane, the first reference direction is obtained by mapping the first azimuth reference direction into the first three-dimensional spatial coordinate system, the third plane is obtained by mapping the first reference plane into the second three-dimensional spatial coordinate system, and the fourth plane is determined by the N three-dimensional space points.

In some embodiments of the present invention, in the aspect of obtaining a second image that is obtained by photographing the antenna at a second position, the processor 602 is specifically configured to obtain the second image that is obtained by the camera by photographing the antenna at the second position.

In some embodiments of the present invention, in the aspect of mapping the N characteristic points included in the second image into a second three-dimensional spatial coordinate system, the processor 602 may be specifically configured to map the N characteristic points included in the second image into the second three-dimensional spatial coordinate system according to an internal parameter and an external parameter of the camera.

It may be understood that, it is assumed that the first reference plane is the horizontal plane, the normal direction of the fourth plane is parallel to a direction obtained by mapping the pointing direction of the antenna into a second three-dimensional coordinate system, and the first azimuth reference direction is a due north direction, so that the downtilt of the antenna obtained according to the third angle is equal to the third angle, and the azimuth of the antenna obtained according to the fourth angle is equal to the fourth angle. It is further assumed that, a third included angle greater than 0 degree exists between the first reference plane and the horizontal plane, the normal direction of the fourth plane is parallel to a direction obtained by mapping the pointing direction of the antenna into a second three-dimensional coordinate system, and a first included angle greater than 0 degree exists between the first azimuth reference direction and a due north direction, so that geometric calibration may be performed on the third angle according to the third included angle to obtain the downtilt of the antenna (the downtilt of the antenna may be equal to the third angle plus/minus the third included angle), and geometric calibration may be performed on the fourth angle according to the first included angle to obtain the azimuth of the antenna (the azimuth of the antenna is equal to the fourth angle plus/minus the first included angle). The rest can be obtained through deduction, for a manner of performing geometric calibration on the third angle to obtain the downtilt of the antenna in another scenario, details are no longer described herein, and for a manner of performing geometric calibration on the fourth angle to obtain the azimuth of the antenna in another scenario, details are no longer described herein.

It may be understood that, the antenna may include k characteristic points, and the N characteristic points may be some or all of the characteristic points of the k characteristic points. An intersection set between the N characteristic points and the M characteristic points may be an empty set or a nonempty set.

It may be understood that, an average value of azimuths of the antenna that are obtained through more times of measurement and calculation may also be calculated, and the average value is used as the obtained azimuth of the antenna; an average value of downtilts of the antenna that are obtained through more times of measurement and calculation may also be calculated, and the average value is used as the obtained downtilt of the antenna. A specific manner is no longer described in detail herein.

It may be understood that, the first position and the second position are different positions, and images obtained by photographing a same antenna at different positions help to obtain an antenna engineering parameter more accurately.

It may be understood that, functions of functional modules of the measurement device 700 in this embodiment may be specifically implemented according to the method in the foregoing method embodiment. For a specific implementation process of the measurement device 700, refer to related descriptions in the foregoing method embodiment, and details are no longer described herein.

As can be seen, the measurement device 700 in this embodiment obtains a first image that is obtained by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system, to obtain M three-dimensional space points that are in the first three-dimensional spatial coordinate system and that have a mapping relationship with the M characteristic points. In this way, a mapping relationship between a practical scenario and a mathematical model is established, and a photographing direction of photographing the first image is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that, in the solution in this embodiment, a photograph of a practical scenario is used to establish a mapping relationship between a practical scenario and a mathematical model, so as to calculate an engineering parameter of an antenna by using such a mathematical model. Compared with an existing manner of on-site manual measurement, the solution in this embodiment helps to improve precision of an obtained antenna engineering parameter, thereby providing a basis for improvement of reception and transmission performance of a signal. Moreover, because basically only a photograph of an antenna needs to be photographed and used as input, such a solution also helps to greatly reduce difficulty of measuring an antenna engineering parameter.

Figure 8:
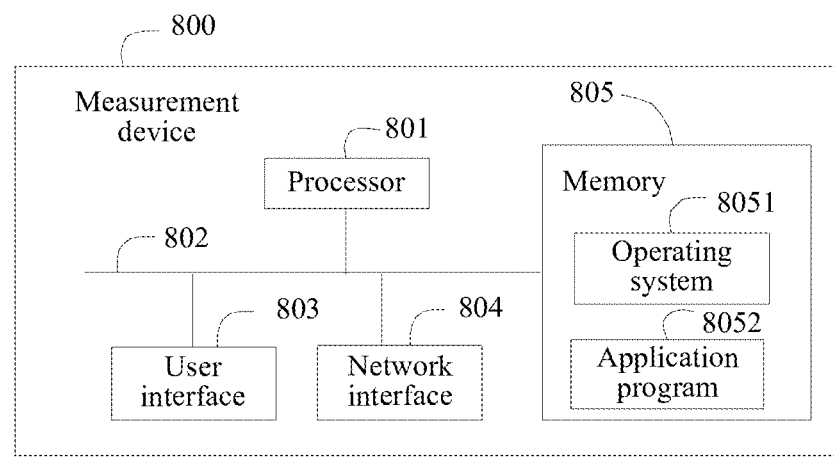
FIG. 8 is a schematic diagram of another measurement device according to an embodiment of the present invention.

Referring to FIG. 8, FIG. 8 is a structural block diagram of a measurement device 800 according to another embodiment of the present invention.

The measurement device 800 may include: at least one processor 801, at least one network interface 804 or another user interface 803, a memory 805, and at least one communications bus 802. The communications bus 802 is configured to implement connection and communication between these components. The user interface 803 optionally included in the measurement device 800 includes: a display (such as a touchscreen, an LCD, a CRT, holographic imaging (Holographic), or a projector (Projector)), a click device (such as a mouse, a trackball (trackball) touchpad, or a touchscreen), a camera, and/or a pickup apparatus.

The memory 802 may include a read-only memory and a random access memory, and provide an instruction and data to the processor 801. A part of the memory 802 may further include a non-volatile random access memory (NVRAM).

In some implementation manners, the memory 805 stores the following elements, an executable module or a data structure, or a subset thereof, or an extension set thereof: an operating system 8051, including various system programs and used to implement various basic services and process a hardware-based task; and an application program module 8052, including various application programs and used to implement various application services.

The application program module 8052 includes, but is not limited to, an obtaining unit 610, a mapping unit 620, and an estimation unit 630.

In this embodiment of the present invention, by invoking the programs or the instruction stored in the memory 805, the processor 801 obtains a first image that is obtained by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system, to obtain M three-dimensional space points that are in the first three-dimensional spatial coordinate system and that have a mapping relationship with the M characteristic points, where a first mapping photographing direction is parallel to a direction of an axis in the first three-dimensional spatial coordinate system, or an included angle having a specified angle exists between a first mapping photographing direction and a direction of an axis in the first three-dimensional spatial coordinate system, and the first mapping photographing direction is obtained by mapping a photographing direction of photographing the first image into the first three-dimensional spatial coordinate system; and obtains a downtilt of the antenna according to a first angle and/or obtains an azimuth of the antenna according to a second angle, where the second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

In some embodiments of the present invention, the first azimuth reference direction may be, for example, a due north direction or a due south direction, or a first included angle greater than 0 degree exists between the first azimuth reference direction and a due north direction (that is, the first azimuth reference direction can be determined according to the due north direction and the first included angle), or a second included angle greater than 0 degree exists between the first azimuth reference direction and a due south direction (that is, the first azimuth reference direction can be determined according to the due south direction and the second included angle). Similarly, the first azimuth reference direction may also be, for example, a due east direction or a due west direction, or a fifth included angle greater than 0 degree exists between the first azimuth reference direction and a due east direction (that is, the first azimuth reference direction can be determined according to the due east direction and the fifth included angle), or a sixth included angle greater than 0 degree exists between the first azimuth reference direction and a due east direction (that is, the first azimuth reference direction can be determined according to the due west direction and the sixth included angle).

In some embodiments of the present invention, the first reference plane may be a horizontal plane, or a third included angle greater than 0 degree exists between the first reference plane and a horizontal plane (that is, the first reference plane can be determined according to the horizontal plane and the third included angle). Similarly, the first reference plane may also be a vertical plane, or a seventh included angle greater than 0 degree exists between the first reference plane and a vertical plane (that is, the first reference plane can be determined according to the vertical plane and the seventh included angle).

In some embodiments of the present invention, in the aspect of obtaining a first image that is obtained by photographing an antenna at a first position, the processor 801 is specifically configured to obtain the first image that is obtained by a camera by photographing the antenna at the first position.

In some embodiments of the present invention, in the aspect of mapping the M characteristic points included in the first image into the first three-dimensional spatial coordinate system, the processor 801 is specifically configured to obtain, according to an internal parameter and an external parameter of the camera, the first image that is obtained by the camera by photographing the antenna at the first position.

For a terminal device (such as a smartphone or a tablet computer), the terminal device may determine a due north direction or a due south direction by using a magnetic flux sensor, a compass, or the like in the terminal device. The terminal device may also obtain a gravity direction by using a gravity sensor, and a vertical plane of the gravity direction is the horizontal plane. Alternatively, a gravity direction, a due north direction, or the like may be determined by using some reference objects in the photographed image. For example, an antenna pole is usually perpendicular to a ground surface. Therefore, a vertical plane may be determined according to a pointing direction of an antenna pole. When the vertical plane is determined, the horizontal plane is determined. The horizontal plane may be mapped into a three-dimensional coordinate system and used as a reference plane. For example, the first reference plane may be the horizontal plane, and the first plane may be obtained by mapping the horizontal plane into the first three-dimensional spatial coordinate system. It may be understood that, a scenario in which a reference direction or a reference plane is determined by using another reference object may be similar thereto.

In some embodiments of the present invention, the normal direction of the second plane may be, for example, parallel to a direction obtained by mapping a pointing direction of the antenna into a first three-dimensional coordinate system. Alternatively, a fourth included angle greater than 0 degree exists between the normal direction of the second plane and the direction obtained by mapping the pointing direction of the antenna into the first three-dimensional coordinate system (that is, the direction obtained by mapping the pointing direction of the antenna into the first three-dimensional coordinate system is determined according to the normal direction of the second plane and the fourth included angle).

In some embodiments of the present invention, if the first image is a digital photograph, the external parameter of the camera is (R=[Rx, Ry, Rz], T=(Tx, Ty, Tz)); the internal parameter of the camera is (fx, fy, u0, v0); and a mapping relationship between pixel coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 1.

In some embodiments of the present invention, in the aspect of mapping the M characteristic points included in the first image into the first three-dimensional spatial coordinate system according to an internal parameter and an external parameter of the camera, the processor 801 is specifically configured to map the M characteristic points included in the first image into the first three-dimensional spatial coordinate system according to the internal parameter and the external parameter of the camera and a uniform scaling parameter z from a photosensitive component of the camera to the first image.

In some embodiments of the present invention, if the first image is a film photograph, the external parameter of the camera is (R=[Rx, Ry, Rz], T=(Tx, Ty, Tz)); the internal parameter of the camera is (fx, fy, u0, v0); and a mapping relationship between coordinates $(u_p, u_p)$ of any Characteristic Point of the M Characteristic Points Included in the first image and coordinates $(x_w, y_w, z_w)$ of a three-dimensional space point obtained by mapping the characteristic point into the first three-dimensional spatial coordinate system may be shown in the formula 2.

It may be understood that, it is assumed that the first reference plane is the horizontal plane, a direction obtained by mapping the pointing direction of the antenna into the first three-dimensional coordinate system may be parallel to the normal direction of the second plane, and the first azimuth reference direction is a due north direction, so that the downtilt of the antenna obtained according to the first angle is equal to the first angle, and the azimuth of the antenna obtained according to the second angle is equal to the second angle. It is further assumed that, a third included angle greater than 0 degree exists between the first reference plane and the horizontal plane, a direction obtained by mapping the pointing direction of the antenna into the first three-dimensional coordinate system may be parallel to the normal direction of the second plane, and a first included angle greater than 0 degree exists between the first azimuth reference direction and a due north direction, so that geometric calibration may be performed on the first angle according to the third included angle to obtain the downtilt of the antenna (the downtilt of the antenna is equal to the first angle plus/minus the third included angle), and geometric calibration may be performed on the second angle according to the first included angle to obtain the azimuth of the antenna (the azimuth of the antenna is equal to the second angle plus/minus the first included angle). The rest can be obtained through deduction, for a manner of performing geometric calibration on the first angle to obtain the downtilt of the antenna in another scenario, details are no longer described herein, and for a manner of performing geometric calibration on the second angle to obtain the azimuth of the antenna in another scenario, details are no longer described herein.

In some embodiments of the present invention, the processor 801 may be further configured to: obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image by the camera into the second three-dimensional spatial coordinate system.

In the aspect of obtaining a downtilt of the antenna according to a first angle, the processor 801 is specifically configured to obtain the downtilt of the antenna according to the first angle and a third angle, where the third angle is equal to an included angle between a normal direction of a fourth plane and a third plane, the third plane is obtained by mapping the first reference plane into the second three-dimensional spatial coordinate system, and the fourth plane is determined by the N three-dimensional space points.

In some other embodiments of the present invention, the processor 801 may be further configured to: obtain a second image that is obtained by photographing the antenna at a second position, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into a second three-dimensional spatial coordinate system, to obtain N three-dimensional space points that are in the second three-dimensional spatial coordinate system and that have a mapping relationship with the N characteristic points, where a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image by the camera into the second three-dimensional spatial coordinate system.

In the aspect of obtaining an azimuth of the antenna according to a second angle, the processor 801 is specifically configured to obtain the azimuth of the antenna according to the second angle and a fourth angle, where the fourth angle is equal to an included angle between a first reference direction in a third plane and a projection of a normal direction of a fourth plane on the third plane, the first reference direction is obtained by mapping the first azimuth reference direction into the first three-dimensional spatial coordinate system, the third plane is obtained by mapping the first reference plane into the second three-dimensional spatial coordinate system, and the fourth plane is determined by the N three-dimensional space points.

In some embodiments of the present invention, in the aspect of obtaining a second image that is obtained by photographing the antenna at a second position, the processor 602 is specifically configured to obtain the second image that is obtained by the camera by photographing the antenna at the second position.

In some embodiments of the present invention, in the aspect of mapping the N characteristic points included in the second image into a second three-dimensional spatial coordinate system, the processor 602 may be specifically configured to map the N characteristic points included in the second image into the second three-dimensional spatial coordinate system according to an internal parameter and an external parameter of the camera.

It may be understood that, it is assumed that the first reference plane is the horizontal plane, the normal direction of the fourth plane is parallel to a direction obtained by mapping the pointing direction of the antenna into a second three-dimensional coordinate system, and the first azimuth reference direction is a due north direction, so that the downtilt of the antenna obtained according to the third angle is equal to the third angle, and the azimuth of the antenna obtained according to the fourth angle is equal to the fourth angle. It is further assumed that, a third included angle greater than 0 degree exists between the first reference plane and the horizontal plane, the normal direction of the fourth plane is parallel to a direction obtained by mapping the pointing direction of the antenna into a second three-dimensional coordinate system, and a first included angle greater than 0 degree exists between the first azimuth reference direction and a due north direction, so that geometric calibration may be performed on the third angle according to the third included angle to obtain the downtilt of the antenna (the downtilt of the antenna may be equal to the third angle plus/minus the third included angle), and geometric calibration may be performed on the fourth angle according to the first included angle to obtain the azimuth of the antenna (the azimuth of the antenna is equal to the fourth angle plus/minus the first included angle). The rest can be obtained through deduction, for a manner of performing geometric calibration on the third angle to obtain the downtilt of the antenna in another scenario, details are no longer described herein, and for a manner of performing geometric calibration on the fourth angle to obtain the azimuth of the antenna in another scenario, details are no longer described herein.

It may be understood that, the antenna may include k characteristic points, and the N characteristic points may be some or all of the characteristic points of the k characteristic points. An intersection set between the N characteristic points and the M characteristic points may be an empty set or a nonempty set.

It may be understood that, an average value of azimuths of the antenna that are obtained through more times of measurement and calculation may also be calculated, and the average value is used as the obtained azimuth of the antenna; an average value of downtilts of the antenna that are obtained through more times of measurement and calculation may also be calculated, and the average value is used as the obtained downtilt of the antenna. A specific manner is no longer described in detail herein.

It may be understood that, the first position and the second position are different positions, and images obtained by photographing a same antenna at different positions help to obtain an antenna engineering parameter more accurately.

It may be understood that, functions of functional modules of the measurement device 800 in this embodiment may be specifically implemented according to the method in the foregoing method embodiment. For a specific implementation process of the measurement device 800, refer to related descriptions in the foregoing method embodiment, and details are no longer described herein.

As can be seen, the measurement device 800 in this embodiment obtains a first image that is obtained by a camera by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system according to an internal parameter and an external parameter of the camera, to obtain M three-dimensional space points that are in the first three-dimensional spatial coordinate system and that have a mapping relationship with the M characteristic points. In this way, a mapping relationship between a practical scenario and a mathematical model is established, and a photographing direction of photographing the first image by the camera is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that, in the solution in this embodiment, a photograph of a practical scenario is used to establish a mapping relationship between a practical scenario and a mathematical model, so as to calculate an engineering parameter of an antenna by using such a mathematical model. Compared with an existing manner of on-site manual measurement, the solution in this embodiment helps to improve precision of an obtained antenna engineering parameter, thereby providing a basis for improvement of reception and transmission performance of a signal. Moreover, because basically only a photograph of an antenna needs to be photographed and used as input, such a solution also helps to greatly reduce difficulty of measuring an antenna engineering parameter.

Figure 9:
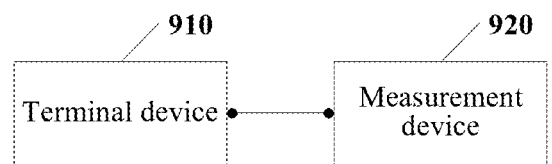
FIG. 9 is a schematic diagram of a measurement system according to an embodiment of the present invention.

Referring to FIG. 9, an embodiment of the present invention further provides a measurement system, which can include:

a terminal device 910 having a camera and a measurement device 920.

The terminal device 910 is configured to: obtain a first image that is obtained by the camera by photographing an antenna at a first position, and send the first image to the measurement device 920.

The measurement device 920 is configured to: receive the first image, where the first image includes at least M characteristic points on the antenna, the M characteristic points are characteristic points on a surface of the antenna, the M characteristic points are in a same plane but are not on a same straight line, and M is a positive integer greater than 2; map the M characteristic points included in the first image into a first three-dimensional spatial coordinate system according to an internal parameter and an external parameter of the camera, to obtain M three-dimensional space points that are in the first three-dimensional spatial coordinate system and that have a mapping relationship with the M characteristic points, where a first mapping photographing direction is parallel to a direction of an axis in the first three-dimensional spatial coordinate system, or an included angle having a specified angle exists between a first mapping photographing direction and a direction of an axis in the first three-dimensional spatial coordinate system, and the first mapping photographing direction is obtained by mapping a photographing direction of photographing the first image by the camera into the first three-dimensional spatial coordinate system; and obtain a downtilt of the antenna according to a first angle and/or obtain an azimuth of the antenna according to a second angle, where the second angle is equal to an included angle between a first reference direction in a first plane and a projection of a normal direction of a second plane on the first plane, the first angle is equal to an included angle between the normal direction of the second plane and the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system.

It may be understood that, the antenna may include k characteristic points, and the M characteristic points may be some or all of the characteristic points of the k characteristic points. A position relationship between a plane defined by these characteristic points and a pointing direction of the antenna may be determined. For example, the position relationship between the plane defined by these characteristic points and the pointing direction of the antenna may be a parallel relationship, a perpendicular relationship, or a relationship of another specific angle.

In some embodiments of the present invention, the first azimuth reference direction may be, for example, a due north direction or a due south direction, or a first included angle greater than 0 degree exists between the first azimuth reference direction and a due north direction (that is, the first azimuth reference direction can be determined according to the due north direction and the first included angle), or a second included angle greater than 0 degree exists between the first azimuth reference direction and a due south direction (that is, the first azimuth reference direction can be determined according to the due south direction and the second included angle). Similarly, the first azimuth reference direction may also be, for example, a due east direction or a due west direction, or a fifth included angle greater than 0 degree exists between the first azimuth reference direction and a due east direction (that is, the first azimuth reference direction can be determined according to the due east direction and the fifth included angle), or a sixth included angle greater than 0 degree exists between the first azimuth reference direction and a due east direction (that is, the first azimuth reference direction can be determined according to the due west direction and the sixth included angle).

In some embodiments of the present invention, the first reference plane may be a horizontal plane, or a third included angle greater than 0 degree exists between the first reference plane and a horizontal plane (that is, the first reference plane can be determined according to the horizontal plane and the third included angle). Similarly, the first reference plane may also be a vertical plane, or a seventh included angle greater than 0 degree exists between the first reference plane and a vertical plane (that is, the first reference plane can be determined according to the vertical plane and the seventh included angle).

For the terminal device 910 (such as a smartphone or a tablet computer), the terminal device may determine a due north direction or a due south direction by using a magnetic flux sensor, a compass, or the like in the terminal device. The terminal device 910 may also obtain a gravity direction by using a gravity sensor, and a vertical plane of the gravity direction is the horizontal plane. Alternatively, a gravity direction, a due north direction, or the like may be determined by using some reference objects in the photographed image. For example, an antenna pole is usually perpendicular to a ground surface. Therefore, a vertical plane may be determined according to a pointing direction of an antenna pole. When the vertical plane is determined, the horizontal plane is determined. The horizontal plane may be mapped into a three-dimensional coordinate system and used as a reference plane. For example, the first reference plane in step 103 may be the horizontal plane, and the first plane may be obtained by mapping the horizontal plane into the first three-dimensional spatial coordinate system. It may be understood that, a scenario in which a reference direction or a reference plane is determined by using another reference object may be similar thereto.

In some embodiments of the present invention, the normal direction of the second plane may be, for example, parallel to a direction obtained by mapping the pointing direction of the antenna into a first three-dimensional coordinate system. Alternatively, a fourth included angle greater than 0 degree exists between the normal direction of the second plane and the direction obtained by mapping the pointing direction of the antenna into the first three-dimensional coordinate system (that is, the direction obtained by mapping the pointing direction of the antenna into the first three-dimensional coordinate system is determined according to the normal direction of the second plane and the fourth included angle).

It may be understood that, it is assumed that the first reference plane is the horizontal plane, a direction obtained by mapping the pointing direction of the antenna into the first three-dimensional coordinate system is parallel to the normal direction of the second plane, and the first azimuth reference direction is a due north direction, so that the downtilt of the antenna obtained according to the first angle is equal to the first angle, and the azimuth of the antenna obtained according to the second angle is equal to the second angle. It is further assumed that, a third included angle greater than 0 degree exists between the first reference plane and the horizontal plane, a direction obtained by mapping the pointing direction of the antenna into the first three-dimensional coordinate system is parallel to the normal direction of the second plane, and a first included angle greater than 0 degree exists between the first azimuth reference direction and a due north direction, so that geometric calibration may be performed on the first angle according to the third included angle to obtain the downtilt of the antenna (the downtilt of the antenna is equal to the first angle plus/minus the third included angle), and geometric calibration may be performed on the second angle according to the first included angle to obtain the azimuth of the antenna (the azimuth of the antenna is equal to the second angle plus/minus the first included angle). The rest can be obtained through deduction, for a manner of performing geometric calibration on the first angle to obtain the downtilt of the antenna in another scenario, details are no longer described herein, and for a manner of performing geometric calibration on the second angle to obtain the azimuth of the antenna in another scenario, details are no longer described herein.

In some embodiments of the present invention, if the first image is a digital photograph, the external parameter of the camera is (R=[Rx, Ry, Rz], T=(Tx, Ty, Tz)); the internal parameter of the camera is (fx, fy, u0, v0); and a mapping relationship between pixel coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 1.

In some embodiments of the present invention, if the first image is a film photograph, in the aspect of mapping the M characteristic points included in the first image into the first three-dimensional spatial coordinate system according to an internal parameter and an external parameter of the camera, the measurement device 920 is specifically configured to map the M characteristic points included in the first image into the first three-dimensional spatial coordinate system according to the internal parameter and the external parameter of the camera and a uniform scaling parameter z from a photosensitive component of the camera to the first image.

For example, if the external parameter of the camera is (R=[Rx, Ry, Rz], T=(Tx, Ty, Tz)); the internal parameter of the camera is (fx, fy, u0, v0); and a mapping relationship between coordinates $(u_p, v_p)$ of any characteristic point of the M characteristic points included in the first image and coordinates $(x_w, y_w, z_w)$ of a three-dimensional space point obtained by mapping the characteristic point into the first three-dimensional spatial coordinate system may be shown in the formula 2.

In some embodiments of the present invention, the measurement device 920 may also use images obtained by the camera in the terminal device 910 by respectively photographing the antenna at multiple different positions to respectively measure and calculate azimuths and/or downtilts of the antenna, use an average value of the azimuths of the antenna that are obtained through multiple times of measurement and calculation as the obtained azimuth of the antenna, and use an average value of the downtilts of the antenna that are obtained through multiple times of measurement and calculation as the obtained downtilt of the antenna.

For example, the terminal device 910 may further obtain a second image that is obtained by the camera by photographing the antenna at a second position, and send the second image to the measurement device 920.

The measurement device 920 may be further configured to receive the second image, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into the second three-dimensional spatial coordinate system according to an internal parameter and an external parameter of the camera, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image by the camera into the second three-dimensional spatial coordinate system. To reduce computational complexity, in an example of this embodiment of the present invention, an example in which the second mapping photographing direction is parallel to the direction of an axis (for example, a y axis) in the second three-dimensional spatial coordinate system is mainly used.

In the aspect of obtaining a downtilt of the antenna according to a first angle, the measurement device 920 may be specifically configured to obtain the downtilt of the antenna according to the first angle and a third angle (for example, obtain the downtilt of the antenna according to the first angle, obtain the downtilt of the antenna according to the third angle, and use an average value of the downtilt of the antenna obtained according to the first angle and the downtilt of the antenna obtained according to the third angle as the downtilt of the antenna obtained according to the first angle and the third angle), where the third angle is equal to an included angle between a normal direction of a fourth plane and a third plane, the third plane may be obtained by mapping the first reference plane into the second three-dimensional spatial coordinate system, and the fourth plane may be determined by the N three-dimensional space points.

For another example, the terminal device 910 may further obtain a second image that is obtained by the camera by photographing the antenna at a second position (or a third position), and send the second image to the measurement device 920. The measurement device 920 may be further configured to: receive the second image, where the second image includes at least N characteristic points on the antenna, the N characteristic points are characteristic points on a surface of the antenna, the N characteristic points are in a same plane but are not on a same straight line, and N is a positive integer greater than 2; and map the N characteristic points included in the second image into the second three-dimensional spatial coordinate system according to an internal parameter and an external parameter of the camera, to obtain N three-dimensional space points that are in the second three-dimensional spatial coordinate system and that have a mapping relationship with the N characteristic points, where a second mapping photographing direction may be parallel to the direction of an axis in the second three-dimensional spatial coordinate system, or an included angle having a specified angle exists between a second mapping photographing direction and the direction of an axis in the second three-dimensional spatial coordinate system, and the second mapping photographing direction is obtained by mapping a photographing direction of photographing the second image by the camera into the second three-dimensional spatial coordinate system. To reduce computational complexity, in an example of this embodiment of the present invention, an example in which the second mapping photographing direction is parallel to the direction of an axis (for example, a y axis) in the second three-dimensional spatial coordinate system is mainly used. In the aspect of obtaining an azimuth of the antenna according to a second angle, the measurement device 920 may be specifically configured to obtain the azimuth of the antenna according to the second angle and a fourth angle (for example, the azimuth of the antenna may be obtained according to the second angle, the azimuth of the antenna may be obtained according to the fourth angle, an average value of the azimuth of the antenna obtained according to the second angle and the azimuth of the antenna obtained according to the fourth angle is used as the azimuth of the antenna obtained according to the second angle and the fourth angle), where the fourth angle is equal to an included angle between a third reference direction in a third plane and a projection of a normal direction of a fourth plane on the third plane, the third reference direction may be obtained by mapping a first azimuth reference direction into the second three-dimensional spatial coordinate system, the third plane may be obtained by mapping the first reference plane into the second three-dimensional spatial coordinate system, and the fourth plane is determined by the N three-dimensional space points.

It may be understood that, it is assumed that the first reference plane is the horizontal plane, the normal direction of the fourth plane is parallel to a direction obtained by mapping the pointing direction of the antenna into a second three-dimensional coordinate system, and the first azimuth reference direction is a due north direction, so that the downtilt of the antenna obtained according to the third angle is equal to the third angle, and the azimuth of the antenna obtained according to the fourth angle is equal to the fourth angle. It is further assumed that, a third included angle greater than 0 degree exists between the first reference plane and the horizontal plane, the normal direction of the fourth plane is parallel to a direction obtained by mapping the pointing direction of the antenna into a second three-dimensional coordinate system, and a first included angle greater than 0 degree exists between the first azimuth reference direction and a due north direction, so that geometric calibration may be performed on the third angle according to the third included angle to obtain the downtilt of the antenna (the downtilt of the antenna may be equal to the third angle plus/minus the third included angle), and geometric calibration may be performed on the fourth angle according to the first included angle to obtain the azimuth of the antenna (the azimuth of the antenna is equal to the fourth angle plus/ minus the first included angle). The rest can be obtained through deduction, for a manner of performing geometric calibration on the third angle to obtain the downtilt of the antenna in another scenario, details are no longer described herein, and for a manner of performing geometric calibration on the fourth angle to obtain the azimuth of the antenna in another scenario, details are no longer described herein.

It may be understood that, the antenna may include k characteristic points, and the N characteristic points may be some or all of the characteristic points of the k characteristic points. An intersection set between the N characteristic points and the M characteristic points may be an empty set or a nonempty set.

It may be understood that, an average value of azimuths of the antenna that are obtained through more times of measurement may also be calculated, and the average value is used as the obtained azimuth of the antenna; an average value of downtilts of the antenna that are obtained through more times of measurement may also be calculated, and the average value is used as the obtained downtilt of the antenna. A specific manner is no longer described in detail herein.

It may be understood that, the first position, the second position, and the third position are different positions, and images obtained by photographing a same antenna at different positions help to obtain an antenna engineering parameter more accurately.

As can be seen, the measurement device 920 in this embodiment obtains a first image that is obtained by a camera in the terminal device 910 by photographing an antenna at a first position, where the first image includes at least M characteristic points on the antenna, the M characteristic points are characteristic points on a surface of the antenna, the M characteristic points are in a same plane but are not on a same straight line, and M is a positive integer greater than 2; and maps the M characteristic points included in the first image into a first three-dimensional spatial coordinate system according to an internal parameter and an external parameter of the camera, to obtain M three-dimensional space points that are in the first three-dimensional spatial coordinate system and that have a mapping relationship with the M characteristic points. In this way, a mapping relationship between a practical scenario and a mathematical model is established, and a photographing direction of photographing the first image by the camera is parallel to the direction of an axis in the first three-dimensional spatial coordinate system. On the basis of such a mathematical model, a downtilt of the antenna is obtained according to a first angle and/or an azimuth of the antenna is obtained according to a second angle, where the second angle is equal to an included angle between a first reference direction in a first plane and a projection of a normal direction of a second plane on the first plane, and the first angle is equal to an included angle between the normal direction of the second plane and the first plane. It may be understood that in the solution in this embodiment of the present invention, a photograph of a practical scenario is used to establish a mapping relationship between a practical scenario and a mathematical model, so as to calculate an engineering parameter of an antenna by using such a mathematical model. Compared with an existing manner of on-site manual measurement, the solution provided in this embodiment of the present invention helps to improve precision of an obtained antenna engineering parameter, thereby providing a basis for improvement of reception and transmission performance of a signal. Moreover, because basically only a photograph of an antenna needs to be photographed and used as input, such a solution also helps to greatly reduce difficulty of measuring an antenna engineering parameter.

An embodiment of the present invention further provides a computer storage medium, where the computer storage medium may store a program, and when the program is executed, some or all of the steps of the method, which is recorded in the foregoing method embodiment, for measuring an antenna engineering parameter are included.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are exemplary embodiments, and the related actions and modules are not necessarily mandatory to the present invention.

To better implement the foregoing solutions in the embodiments of the present invention, embodiments of the present invention further provide related apparatuses configured to implement the foregoing solutions.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some characteristic s may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable memory medium. According to such an understanding, the technical solutions of the present invention essentially, or the part contributing to the prior art, or all or a part of the technical solutions may be implemented in the form of a software product. The software product is stored in a memory medium and includes several instructions for instructing a computer device (which may be a personal computer, a server, or a network device) to perform all or a part of the steps of the methods described in the embodiments of the present invention. The foregoing memory medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical characteristic s thereof, without departing from the spirit and scope of the technical solutions of the embodiments of the present invention.

What is claimed is:

1. A method, comprising:
    obtaining, by a device, a first image that is obtained by photographing an antenna at a first position, wherein the first image comprises at least M characteristic points on the antenna, the M characteristic points being characteristic points on a surface of the antenna, the M characteristic points being in a same plane but not on a same straight line, and wherein M is a positive integer greater than 2;
    mapping, by the device, the M characteristic points into a first three-dimensional spatial coordinate system, to obtain M three-dimensional space points that are in the first three-dimensional spatial coordinate system and that have a mapping relationship with the M characteristic points, wherein a first mapping photographing direction is parallel to a direction of an axis in the first three-dimensional spatial coordinate system, or an included angle having a specified angle exists between a first mapping photographing direction and a direction of an axis in the first three-dimensional spatial coordinate system, and the first mapping photographing direction is obtained by mapping a photographing direction of photographing the first image into the first three-dimensional spatial coordinate system; and
    obtaining, by the device, a downtilt of the antenna according to a first angle and/or obtaining an azimuth of the antenna according to a second angle, wherein the first angle is equal to an included angle between the normal direction of a second plane and the normal direction of a first plane, the second angle is equal to an included angle between a first reference direction in the first plane and a projection of a normal direction of the second plane on the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system, wherein the first azimuth reference direction is a due north direction or a due south direction, or a first included angle greater than 0 degree exists between the first azimuth reference direction and a due north direction, or a second included angle greater than 0 degree exists between the first azimuth reference direction and a due south direction; and
    performing network optimization using the obtained downtilt of the antenna or the obtained azimuth of the antenna;
    wherein the first reference plane is a horizontal plane, or a third included angle greater than 0 degree exists between the first reference plane and a horizontal plane.

2. The method according to claim 1, wherein the normal direction of the second plane is parallel to a direction obtained by mapping a pointing direction of the antenna into the first three-dimensional spatial coordinate system, or a fourth included angle greater than 0 degree exists between the normal direction of the second plane and a direction obtained by mapping a pointing direction of the antenna into the first three-dimensional spatial coordinate system.

3. The method according to claim 1, wherein obtaining the first image comprises photographing the antenna at the first position using a camera; and
wherein the M characteristic points are mapped according to an internal parameter and an external parameter of the camera, wherein the first image is a digital photograph.

4. The method according to claim 3,
wherein the external parameter of the camera is (R, T), wherein the internal parameter of the camera is (fx, fy, u0, v0); and
wherein a mapping relationship between pixel coordinates $(u_p, u_p)$ of any characteristic point of the M characteristic points comprised in the first image and coordinates $(x_w, y_w, z_w)$ of a three-dimensional space point obtained by mapping the characteristic point into the first three-dimensional spatial coordinate system is as follows, $$\begin{bmatrix} u_p \\ v_p \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

wherein
$x_w$, $y_w$, and $z_w$ indicate a coordinate point in a world coordinate system, T indicates an origin of the world coordinate system, R indicates an orthogonal rotation matrix, $f_x$ and $f_y$ indicate focal lengths of the camera in an x direction and in a y direction, and $u_0$ and $v_0$ indicate a center of imaging.

5. The method according to claim 1, wherein obtaining the first image comprises photographing the antenna at the first position using a camera; and
wherein the M characteristic points are mapped according to an internal parameter and an external parameter of the camera and a uniform scaling parameter z from a photosensitive component of the camera to the first image.

6. The method according to claim 5, wherein the first image is a film photograph,
wherein the external parameter of the camera is (R, T); wherein the internal parameter of the camera is (fx, fy, u0, v0); and
wherein a mapping relationship between coordinates $(u_p, v_p)$ of any characteristic point of the M characteristic points comprised in the first image and coordinates $(x_w, y_w, z_w)$ of a three-dimensional space point obtained by mapping the characteristic point into the first three-dimensional spatial coordinate system is as follows, $$\begin{bmatrix} u_p \\ v_p \\ 1 \end{bmatrix} = z \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

wherein
$x_w$, $y_w$, and $z_w$ indicate a coordinate point in a world coordinate system, T indicates an origin of the world coordinate system, R indicates an orthogonal rotation matrix, $f_x$ and $f_y$ indicate focal lengths of the camera in an x direction and in a y direction, $u_0$ and $v_0$ indicate a center of imaging, and z is a uniform scaling coefficient from a photosensitive component to a photograph.

7. The method according to claim 1, further comprising:
obtaining, by the device, a second image that is obtained by photographing the antenna at a second position, wherein the second image comprises at least N characteristic points on the antenna, the N characteristic points being characteristic points on a surface of the antenna, the N characteristic points being in a same plane but are not on a same straight line, and wherein N is a positive integer greater than 2.

8. The method according to claim 7, further comprising:
mapping, by the device, the N characteristic points comprised in the second image into a second three-dimensional spatial coordinate system, to obtain N three-dimensional space points that are in the second three-dimensional spatial coordinate system and that have a mapping relationship with the N characteristic points, wherein a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system, wherein the obtaining a downtilt of the antenna according to a first angle comprises: obtaining the downtilt of the antenna according to the first angle and a third angle, wherein the third angle is equal to an included angle between a normal direction of a fourth plane and a normal direction of a third plane, the third plane is obtained by mapping the first reference plane into the second three-dimensional spatial coordinate system, and the fourth plane is determined by the N three-dimensional space points.

9. The method according to claim 7, further comprising:
mapping, by the device, the N characteristic points comprised in the second image into a second three-dimensional spatial coordinate system, to obtain N three-dimensional space points that are in the second three-dimensional spatial coordinate system and that have a mapping relationship with the N characteristic points, wherein a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system,
wherein obtaining the azimuth of the antenna according to the second angle comprises:
obtaining the azimuth of the antenna according to the second angle and a fourth angle, wherein the fourth angle is equal to an included angle between a first reference direction in a third plane and a projection of a normal direction of a fourth plane on the third plane, the first reference direction is obtained by mapping the first azimuth reference direction into the first three-dimensional spatial coordinate system, the third plane is obtained by mapping the first reference plane into the second three-dimensional spatial coordinate system, and the fourth plane is determined by the N three-dimensional space points.

10. An apparatus for measuring an antenna engineering parameter, the apparatus comprising:
a processor;
a non-transitory memory storing a program, the program comprising a plurality of units of instruction, the plurality of units comprising:
an obtaining unit configured to obtain a first image that is obtained by photographing an antenna at a first position, wherein the first image comprises at least M characteristic points on the antenna, the M characteristic points are characteristic points on a surface of the antenna, the M characteristic points are in a same plane but are not on a same straight line, and M is a positive integer greater than 2;
a mapping unit configured to map the M characteristic points comprised in the first image into a first three-dimensional spatial coordinate system, to obtain M three-dimensional space points that are in the first three-dimensional spatial coordinate system and that have a mapping relationship with the M characteristic points, wherein a first mapping photographing direction is parallel to a direction of an axis in the first three-dimensional spatial coordinate system, or an included angle having a specified angle exists between a first mapping photographing direction and a direction of an axis in the first three-dimensional spatial coordinate system, and the first mapping photographing direction is obtained by mapping a photographing direction of photographing the first image into the first three-dimensional spatial coordinate system;
an estimation unit configured to obtain a downtilt of the antenna according to a first angle and/or obtain an azimuth of the antenna according to a second angle, wherein the second angle is equal to an included angle between a first reference direction in a first plane and a projection of a normal direction of a second plane on the first plane, the first angle is equal to an included angle between the normal direction of the second plane and the normal direction of the first plane, the first plane is obtained by mapping a first reference plane into the first three-dimensional spatial coordinate system, the second plane is determined by the M three-dimensional space points, and the first reference direction is obtained by mapping a first azimuth reference direction into the first three-dimensional spatial coordinate system, wherein the first azimuth reference direction is a due north direction or a due south direction, or a first included angle greater than 0 degree exists between the first azimuth reference direction and a due north direction, or a second included angle greater than 0 degree exists between the first azimuth reference direction and a due south direction; and wherein the first reference plane is a horizontal plane, or a third included angle greater than 0 degree exists between the first reference plane and a horizontal plane; and
an optimization unit, configured to perform network optimization using the downtilt of the antenna obtained by the estimation unit or the azimuth of the antenna obtained by the estimation unit.

11. The apparatus according to claim 10, wherein the normal direction of the second plane is parallel to a direction obtained by mapping a pointing direction of the antenna into the first three-dimensional spatial coordinate system, or a fourth included angle greater than 0 degree exists between the normal direction of the second plane and a direction obtained by mapping a pointing direction of the antenna into the first three-dimensional spatial coordinate system.

12. The apparatus according to claim 10, wherein the obtaining unit is configured to obtain the first image that is obtained by a camera by photographing the antenna at the first position; and
wherein the mapping unit is configured to map the M characteristic points comprised in the first image into the first three-dimensional spatial coordinate system according to an internal parameter and an external parameter of the camera.

13. The apparatus according to 12, wherein the first image is a digital photograph,
wherein the external parameter of the camera is (R, T);
wherein the internal parameter of the camera is (fx, fy, u0, v0); and
wherein a mapping relationship between pixel coordinates $(u_p, v_p)$ of any characteristic point of the M characteristic points comprised in the first image and coordinates $(x_w, y_w, z_w)$ of a three-dimensional space point obtained by mapping the characteristic point into the first three-dimensional spatial coordinate system is as follows, $$\begin{bmatrix} u_p \\ v_p \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

wherein
$x_w$, $y_w$, and $z_w$ indicate a coordinate point in a world coordinate system, T indicates an origin of the world coordinate system, R indicates an orthogonal rotation matrix, $f_x$ and $f_y$ indicate focal lengths of the camera in an x direction and in a y direction, and $u_0$ and $v_0$ indicate a center of imaging.

14. The apparatus according to claim 10, wherein the obtaining unit is configured to obtain the first image that is obtained by a camera by photographing the antenna at the first position; and
wherein the mapping unit is configured to map the M characteristic points comprised in the first image into the first three-dimensional spatial coordinate system according to an internal parameter and an external parameter of the camera and a uniform scaling parameter z from a photosensitive component of the camera to the first image.

15. The apparatus according to claim 14, wherein the first image is a film photograph,
wherein the external parameter of the camera is (R, T);
wherein the internal parameter of the camera is (fx, fy, u0, v0); and
wherein a mapping relationship between coordinates $(u_p, v_p)$ of any characteristic point of the M characteristic points comprised in the first image and coordinates $(x_w, y_w, z_w)$ of a three-dimensional space point obtained by mapping the characteristic point into the first three-dimensional spatial coordinate system is as follows, $$\begin{bmatrix} u_p \\ v_p \\ 1 \end{bmatrix} = z \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0^T & 1 \end{bmatrix} \begin{bmatrix} x_w \\ y_w \\ z_w \\ 1 \end{bmatrix},$$

wherein $x_w$, $y_w$, and $z_w$ indicate a coordinate point in a world coordinate system, T indicates an origin of the world coordinate system, R indicates an orthogonal rotation matrix, $f_x$ and $f_y$ indicate focal lengths of the camera in an x direction and in a y direction, $u_0$ and $v_0$ indicate a center of imaging, and z is a uniform scaling coefficient from a photosensitive component to a photograph.

16. The apparatus according to claim 10,
wherein the obtaining unit is further configured to obtain a second image that is obtained by photographing the antenna at a second position, wherein the second image comprises at least N characteristic points on the antenna, the N characteristic points are characteristic points on a surface of the antenna, the N characteristic points are in a same plane but are not on a same straight line, and N is a positive integer greater than 2.

17. The apparatus according to claim 16,
wherein the mapping unit is further configured to map the N characteristic points comprised in the second image into a second three-dimensional spatial coordinate system, to obtain N three-dimensional space points that are in the second three-dimensional spatial coordinate system and that have a mapping relationship with the N characteristic points, wherein a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system,
wherein the estimation unit is configured to obtain the downtilt of the antenna according to the first angle and a third angle, wherein the third angle is equal to an included angle between a normal direction of a fourth plane and a normal direction of a third plane, the third plane is obtained by mapping the first reference plane into the second three-dimensional spatial coordinate system, and the fourth plane is determined by the N three-dimensional space points.

18. The apparatus according to claim 10, wherein the obtaining unit is further configured to obtain a second image that is obtained by photographing the antenna at a second position, wherein the second image comprises at least N characteristic points on the antenna, the N characteristic points are characteristic points on a surface of the antenna, the N characteristic points are in a same plane but are not on a same straight line, and N is a positive integer greater than 2; and
wherein the mapping unit is further configured to map the N characteristic points comprised in the second image into a second three-dimensional spatial coordinate system, to obtain N three-dimensional space points that are in the second three-dimensional spatial coordinate system and that have a mapping relationship with the N characteristic points, wherein a second mapping photographing direction is parallel to a direction of an axis in the second three-dimensional spatial coordinate system, or an included angle having a specified angle exists between a second mapping photographing direction and a direction of an axis in the second three-dimensional spatial coordinate system, and the second mapping photographing direction is obtained by mapping a photographing direction of photographing the second image into the second three-dimensional spatial coordinate system,
wherein the estimation unit is specifically configured to obtain the azimuth of the antenna according to the second angle and a fourth angle, wherein the fourth angle is equal to an included angle between a first reference direction in a third plane and a projection of a normal direction of a fourth plane on the third plane, the first reference direction is obtained by mapping the first azimuth reference direction into the first three-dimensional spatial coordinate system, the third plane is obtained by mapping the first reference plane into the second three-dimensional spatial coordinate system, and the fourth plane is determined by the N three-dimensional space points.

\* \* \* \* \*

UNITED STATES PATENT AND TRADEMARK OFFICE
CERTIFICATE OF CORRECTION

PATENT NO. : 10,069,186 B2  
APPLICATION NO. : 15/360702  
DATED : September 4, 2018  
INVENTOR(S) : Li Page 1 of 1

It is certified that error appears in the above-identified patent and that said Letters Patent is hereby corrected as shown below:

In the Claims

In Column 55, Line 20, Claim 4, delete "$(u_p, u_p)$" and insert --$(u_p, v_p)$--.

Signed and Sealed this  
Sixth Day of November, 2018

Andrei Iancu  
*Director of the United States Patent and Trademark Office*